United States Patent
Takahashi et al.

(10) Patent No.: US 12,412,378 B2
(45) Date of Patent: *Sep. 9, 2025

(54) OBJECT DETECTION DEVICE, LEARNED MODEL GENERATION METHOD, AND RECORDING MEDIUM

(71) Applicant: NEC Corporation, Tokyo (JP)

(72) Inventors: Katsuhiko Takahashi, Tokyo (JP); Yuichi Nakatani, Tokyo (JP); Tetsuo Inoshita, Tokyo (JP); Asuka Ishii, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 370 days.

This patent is subject to a terminal disclaimer.

(21) Appl. No.: 18/026,631

(22) PCT Filed: Sep. 24, 2020

(86) PCT No.: PCT/JP2020/036087
§ 371 (c)(1),
(2) Date: Mar. 16, 2023

(87) PCT Pub. No.: WO2022/064610
PCT Pub. Date: Mar. 31, 2022

(65) Prior Publication Data
US 2023/0334837 A1    Oct. 19, 2023

(51) Int. Cl.
*G06V 10/776* (2022.01)
*G06V 10/74* (2022.01)

(52) U.S. Cl.
CPC .......... *G06V 10/776* (2022.01); *G06V 10/761* (2022.01)

(58) Field of Classification Search
USPC ................................ 382/103, 155, 156, 224
See application file for complete search history.

(56) References Cited

U.S. PATENT DOCUMENTS 10,198,671 B1 *  2/2019  Yang ..................... G06V 10/768
10,699,169 B2 *  6/2020  Kang ..................... G06V 10/80
(Continued)

FOREIGN PATENT DOCUMENTS

JP    2007-058882 A    3/2007
JP    2014-197342 A    10/2014
(Continued)

OTHER PUBLICATIONS

Shen et al., Category-Aware Spatial Constraint for Weakly Supervised Detection, 2019 IEEE 1057-7149, IEEE Transaction on Image Processing, vol. 29, pp. 843-858. (Year: 2019).*

(Continued)

*Primary Examiner* — Ishrat I Sherali

(57) ABSTRACT

In an object detection device, the plurality of object detection units output a score indicating a probability that a predetermined object exists for each partial region set with respect to inputted image data. The weight computation unit uses weight computation parameters to compute a weight for each of the plurality of object detection units on a basis of the image data and outputs of the plurality of object detection units, the weight being used when the scores outputted by the plurality of object detection units are merged. The merging unit merges the scores outputted by the plurality of object detection units for each partial region according to the weights computed by the weight computation unit. The first loss computation unit computes a difference between a ground truth label of the image data and the score merged by the merging unit as a first loss. Then, the first parameter correction unit corrects the weight computation parameters so as to reduce the first loss.

12 Claims, 24 Drawing Sheets

(56) References Cited

U.S. PATENT DOCUMENTS

| | | | |
|---|---|---|---|
| 10,885,370 B2* | 1/2021 | Hakim | G06V 20/582 |
| 12,112,518 B2* | 10/2024 | Takahashi | G06T 7/00 |
| 12,190,570 B2* | 1/2025 | Takahashi | G06T 7/00 |
| 2002/0061135 A1 | 5/2002 | Naoi et al. | |
| 2003/0113016 A1* | 6/2003 | Naoi | G06V 30/414 |
| | | | 382/173 |
| 2019/0095759 A1 | 3/2019 | Kanada | |
| 2021/0103776 A1* | 4/2021 | Jiang | G06T 19/20 |
| 2021/0110206 A1 | 4/2021 | Kanada | |
| 2022/0164577 A1* | 5/2022 | Kurasawa | G06V 10/40 |
| 2022/0230420 A1* | 7/2022 | Cheng | G06V 10/761 |
| 2023/0245422 A1* | 8/2023 | Okada | G06V 10/809 |
| | | | 382/156 |

FOREIGN PATENT DOCUMENTS

| | | |
|---|---|---|
| JP | 2019-036240 A | 3/2019 |
| JP | 2019-061579 A | 4/2019 |
| JP | 2019-079445 A | 5/2019 |
| JP | 2019-215755 A | 12/2019 |

OTHER PUBLICATIONS

International Search Report for PCT Application No. PCT/JP2020/036087, mailed on Dec. 15, 2020.

* cited by examiner

OBJECT DETECTION DEVICE, LEARNED MODEL GENERATION METHOD, AND RECORDING MEDIUM

This application is a National Stage Entry of PCT/JP2020/036087 filed on Sep. 24, 2020, the contents of all of which are incorporated herein by reference, in their entirety.

TECHNICAL FIELD

The present invention relates to a technology that detects an object included in an image.

BACKGROUND ART

It is known that by performing learning using large amounts of pattern data, the performance of a recognizer can be improved. Tuning is also performed to obtain a recognizer suited to each environment from a base recognizer. Moreover, methods of improving the recognition accuracy depending on different environments have been variously proposed. For example, Patent Reference 1 discloses a pattern recognition device that performs a recognition processing in accordance with an environment where text is written. The pattern recognition device performs the recognition processing by calling any one or more recognizers from among a plurality of registered recognizers according to the state of a processing target extracted from an input image.

Also, as another measure for improving recognizer performance, a method has been proposed in which a plurality of recognizers with different characteristics are constructed, and an overall determination is made on the basis of outputs therefrom. For example, Patent Reference 2 discloses an obstacle detection device that makes a final determination on the basis of determination results of a plurality of determination units that determine whether or not an obstacle exists.

PRECEDING TECHNICAL REFERENCES

Patent References

Patent Reference 1: Japanese Patent Application Laid-Open under No. 2007-058882
Patent Reference 2: Japanese Patent Application Laid-Open under No. 2019-036240

SUMMARY

Problem to be Solved by the Invention

In the above techniques, it is assumed that the accuracy of the plurality of recognition devices or determination devices is substantially the same. For this reason, if the accuracy is different among the plurality of recognition devices or determination devices, the accuracy of the final result may be lowered in some cases. Also, in the above techniques, since the recognition performance is improved by using multiple recognizers, the device inevitably becomes a large scale. Therefore, the above-described method cannot be deemed to be appropriate when an object detection device used for video monitoring or other purposes is to be deployed on a site.

One object of the present invention is to provide an object detection device that enables highly accurate object detection according to the inputted image by using a plurality of recognizers of different characteristics.

Means for Solving the Problem

In order to solve the above problem, according to an example aspect of the present invention, there is provided an object detection device comprising:
   a plurality of object detection units configured to output a score indicating a probability that a predetermined object exists for each partial region set with respect to inputted image data;
   a weight computation unit configured to use weight computation parameters to compute a weight for each of the plurality of object detection units on a basis of the image data and outputs of the plurality of object detection units, the weight being used when the scores outputted by the plurality of object detection units are merged;
   a merging unit configured to merge the scores outputted by the plurality of object detection units for each partial region according to the weights computed by the weight computation unit;
   a first loss computation unit configured to compute a difference between a ground truth label of the image data and the score merged by the merging unit as a first loss; and
   a first parameter correction unit configured to correct the weight computation parameters so as to reduce the first loss.

According to another aspect of the present invention, there is provided a learned model generation method comprising:
   outputting, from a plurality of object detection units, a score indicating a probability that a predetermined object exists for each partial region set with respect to inputted image data;
   using weight computation parameters to compute a weight for each of the plurality of object detection units on a basis of the image data and outputs of the plurality of object detection units, the weight being used when the scores outputted by the plurality of object detection units are merged;
   merging the scores outputted by the plurality of object detection units for each partial region according to the computed weights;
   computing a difference between a ground truth label of the image data and the merged score as a first loss; and
   correcting the weight computation parameters so as to reduce the first loss.

According to still another aspect of the present invention, there is provided a recording medium storing a program causing a computer to execute an object detection device learning process comprising:
   outputting, from a plurality of object detection units, a score indicating a probability that a predetermined object exists for each partial region set with respect to inputted image data;
   using weight computation parameters to compute a weight for each of the plurality of object detection units on a basis of the image data and outputs of the plurality of object detection units, the weight being used when the scores outputted by the plurality of object detection units are merged;
   merging the scores outputted by the plurality of object detection units for each partial region according to the computed weights;

computing a difference between a ground truth label of the image data and the merged score as a first loss; and correcting the weight computation parameters so as to reduce the first loss.

According to still another aspect of the present invention, there is provided an object detection device comprising:

a plurality of object detection units configured to output a score indicating probability that a predetermined object exists, for each partial region set to image data inputted;

a weight computation unit configured to compute weights for merging the scores outputted by the plurality of object detection units, using weight computation parameters, based on the image data and outputs of the plurality of object detection units;

a merging unit configured to merge the scores outputted by the plurality of object detection units, for each partial region, with the weights computed by the weight computation unit;

a target model object detection unit configured to output a score indicating probability that the predetermined object exists, for each partial region set to the image data;

a second loss computation unit configured to compute a second loss indicating a difference of the score of the target model object detection unit from a ground truth label of the image data and the score merged by the merging unit; and a second parameter correction unit configured to correct parameters of the target model object detection unit to reduce the second loss.

According to still another aspect of the present invention, there is provided a learned model generation method comprising:

outputting a score indicating probability that a predetermined object exists, for each partial region set to inputted image data, from a plurality of object detection units;

computing weights for merging the scores outputted by the plurality of object detection units, using weight computation parameters, based on the image data and outputs of the plurality of object detection units;

merging the scores outputted by the plurality of object detection units, for each partial region, with the computed weights;

outputting a score indicating probability that the predetermined object exists, for each partial region set to the image data, from a target model object detection unit;

computing a second loss indicating a difference of the score of the target model object detection unit from a ground truth label of the image data and the merged score; and correcting parameters of the target model object detection unit to reduce the second loss.

According to still another aspect of the present invention, there is provided a recording medium recording a program causing a computer to execute a learning processing of an object detection device, comprising:

outputting a score indicating probability that a predetermined object exists, for each partial region set to inputted image data, from a plurality of object detection units;

computing weights for merging the scores outputted by the plurality of object detection units, using weight computation parameters, based on the image data and outputs of the plurality of object detection units;

merging the scores outputted by the plurality of object detection units, for each partial region, with the computed weights;

outputting a score indicating probability that the predetermined object exists, for each partial region set to the image data, from a target model object detection unit;

computing a second loss indicating a difference of the score of the target model object detection unit from a ground truth label of the image data and the merged score; and correcting parameters of the target model object detection unit to reduce the second loss.

EXAMPLE EMBODIMENTS

First Example Embodiment

[Principle]

First, a basic principle in the example embodiments of the present invention will be described. Generally, when an AI (Artificial Intelligence) model for video monitoring is deployed on a site, system integration works for reconstruction of a model (collection of images in the site, annotation, learning, etc.) are often required for each site due to the insufficient recognition accuracy. In the example embodiments, in order to reduce the cost of system integration, first, a large-scale model that is robust to environmental variation is constructed by collecting and merging source models learned in various field environments.

Figure 1:
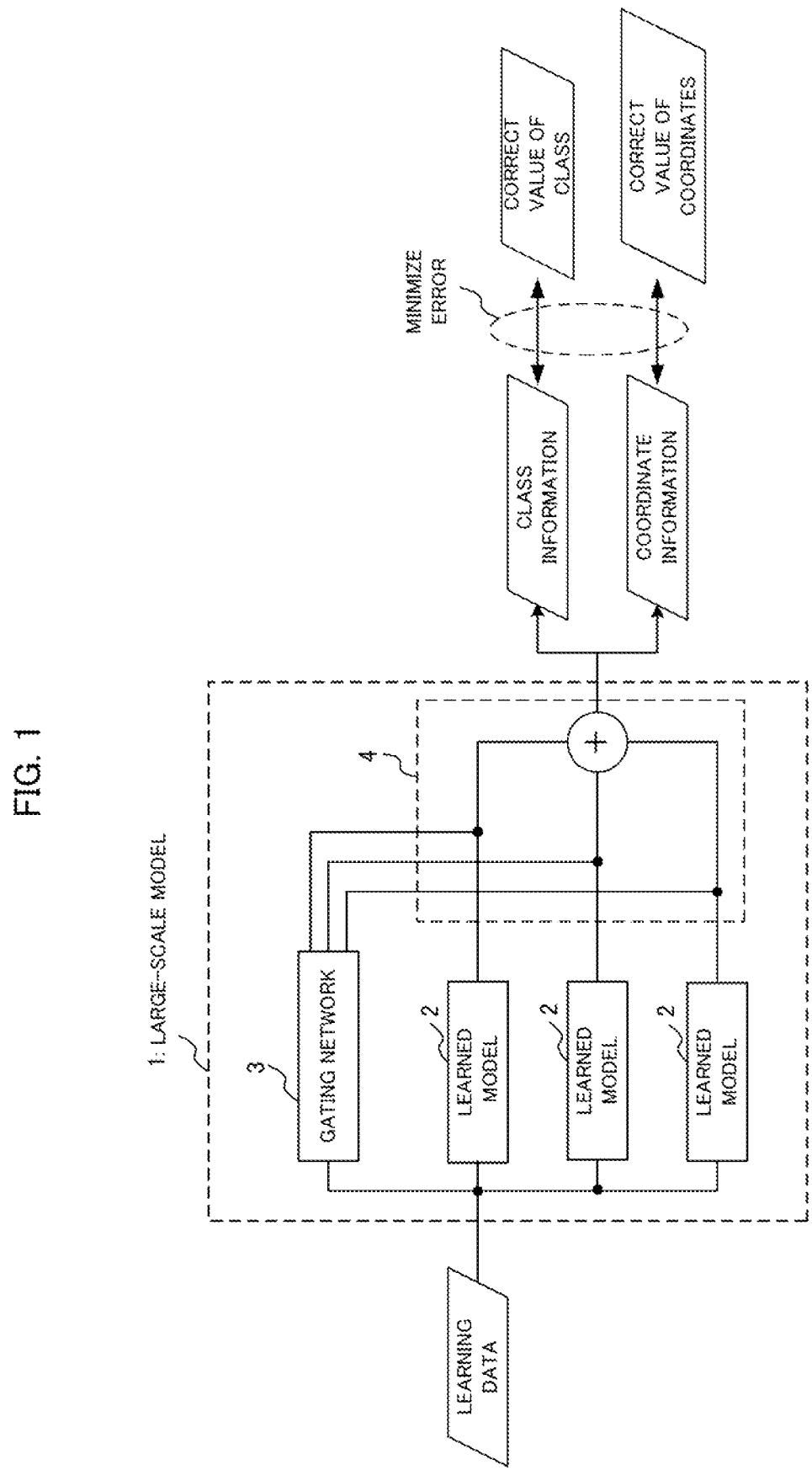
FIG. 1 illustrates a configuration for constructing a large-scale model according to a first example embodiment.

FIG. 1 illustrates a configuration for constructing a large-scale model using multiple learned models. As shown in FIG. 1, the large-scale model 1 includes a plurality of (three in the example of FIG. 1) learned models 2, a gating network 3, and an arithmetic unit 4. The learned model 2 is a source model, each of which is learned in a different environment. Here, the learned model 2 is a model for detecting objects from image data. The image data collected in a new site are inputted as learning data to the plurality of learned models 2 and the gating network 3. Incidentally, in the learning data, the correct value of the class and the correct values of the coordinates are prepared in advance as the ground truth label corresponding the learning data.

Each of the learned models 2 performs object detection based on the inputted learning data, and outputs, for each partial region set at the middle stage of object detection, the class information about the class of the detected object and the coordinate information indicating the position of the partial region. The class information includes a class code indicating the type of the object and a score indicating the probability that the object indicated by the class code exists. The learned model 2 outputs the class information and the coordinate information for each partial region to the gating network 3 and the arithmetic unit 4.

The gating network 3 outputs, to the arithmetic unit 4, weights for the information outputted by each learned model 2 based on the inputted learning data and the class information and the coordinate information for each partial region that are outputted by each learned model 2. The gating network 3 can appropriately set the weights for the learned models 2 by using the class information and the coordinate information for each partial region generated by the learned models 2, in addition to the inputted learning data. Namely, by using the learning data and the object detection results for the learning data by the learned models 2, the gating network 3 estimates whether each learned model 2 is good or poor at detecting the object included in the learning data, and reflects the result to the values of the weights for the learned models 2. Thus, the gating network 3 can compute appropriate weights for the learned models 2.

The arithmetic unit 4 merges the information outputted by the learned models 2 using the weights outputted by the gating network 3. The arithmetic unit 4 outputs the class information that is obtained by merging the class information outputted by the learned models 2 using the weights. Further, the arithmetic unit 4 outputs the coordinate information obtained by merging the coordinate information outputted by the learned models 2 using the weights.

The class information and the coordinate information outputted from the arithmetic unit 4 are compared with the correct value of the class and the correct value of the coordinates prepared in advance, respectively, and the errors are computed. Then, learning of the gating network 3 is performed so as to minimize the errors. Specifically, the parameters of the gating network 3 are corrected so that the errors are reduced. As described above, the gating network 3 estimates whether each learned model 2 is good or poor for each of the inputted image data, and learns the values of the weights indicating the optimal merging ratio of the learned models 2. The learning of the large-scale model 1 is performed until a certain degree of accuracy is obtained. Thus, a large-scale model with high accuracy is constructed using multiple learned source models.

Figure 2:
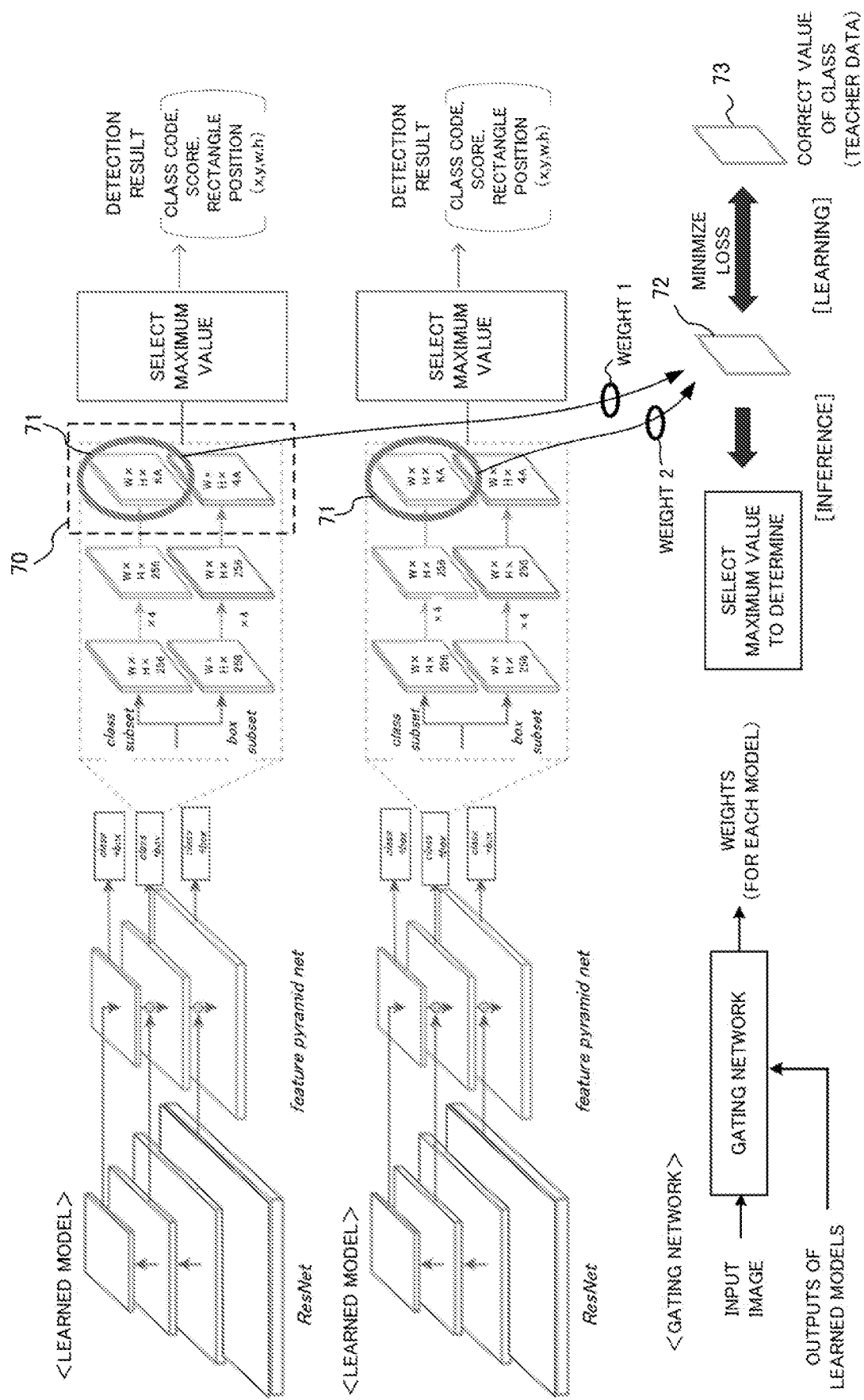
FIG. 2 schematically illustrates an example of constructing a large-scale model.

Next, a specific example of constructing a large-scale model will be described. FIG. 2 schematically shows an example of processing of constructing a large-scale model 1. In FIG. 2, the number of the learned models 2 is set to two. In the example of FIG. 2, the learned model 2 is constructed by RetinaNet. In the example of FIG. 2, for convenience of explanation, it is assumed that only the class information is used among the information outputted by each learned model 2.

The learned model 2 generates a feature pyramid net including a plurality of feature maps of different size from the inputted image data by ResNet (Residual Network). In each feature map, anchor boxes are set, and the learned model 2 performs the object detection for each anchor box. However, in the large-scale model 1, the learned model 2 does not perform the maximum value selection processing of outputting the detected object and its score and the coordinate information in a list format or the like, specifically the NMS (Non-Maximum Suppression) processing, but outputs the class information and the coordinate information of the recognized object computed for each anchor box before the NMS processing as they are. Here, all the partial regions, for which the presence or absence of a recognition target object is inspected, are called "anchor boxes".

Figure 3:
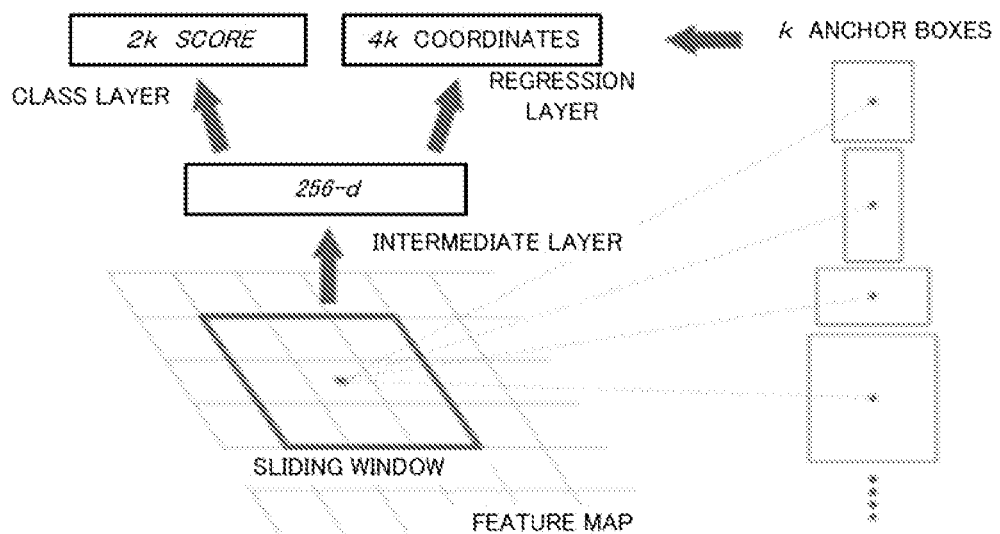
FIG. 3 is a diagram for explaining the concept of anchor boxes.

FIG. 3 is a diagram for explaining the concept of anchor boxes. As illustrated, a sliding window is set on a feature map obtained by the convolution of a CNN (Convolutional Neural Network). In the example of FIG. 3, k anchor boxes (hereinafter simply referred to as "anchors") of different size are set with respect to a single sliding window, and each anchor is inspected for the presence or absence of a recognition target object. In other words, the anchors are k partial regions set with respect to all sliding windows.

The number of anchors depends on the structure and size of the neural network. In FIG. 2, the upper row of an output network 70 stores class information with respect to W×H×A anchors (in K dimensions; that is, there are K types of recognition targets), and the lower row stores coordinate information (in four dimensions) for the W×H×A anchors. Here, "W" indicates the number of variations of the anchor center in the horizontal direction, "H" indicates the number of variations of the anchor center in the vertical direction, and "A" indicates the number of variations in the vertical or horizontal size of the anchor. The coordinate information may be expressed as absolute values of the coordinate information for the four sides on the top, bottom, left, and right of a rectangular region where a recognition target object exists or as relative positions from a reference position uniquely determined for the anchor, or may be expressed from the standpoint of the width and the height of the left side and the top side rather than the four sides.

The output network 70 illustrated in FIG. 2 is set with respect to a single layer of a feature pyramid net, and K-dimensional score information and 4-dimensional coordinate information are outputted similarly with respect to the other layers of the feature pyramid net. Hereinafter, the number of anchors set with respect to all layers of the feature pyramid net is expressed "Na". The score information and the coordinate information for the same anchor are saved in a predetermined memory location of a memory for storing the information, so as to be easily associated with each other.

Each learned model 2 outputs the class information 71 of the number of anchors×the number of classes. The gating network 3 outputs the weight determined for each learned model 2. The arithmetic unit 4 computes the weighted sum for each of the same anchors for the class information outputted from each learned model 2, and outputs the class information 72. The sum of squares of the difference between the class information 72 and the correct value (teacher data) 73 of the class prepared in advance is defined as a loss, and the weights outputted by the gating network 3 are learned so as to minimize this loss. Thus, a large-scale model 1 is constructed.

[Hardware Configuration]

Figure 4:
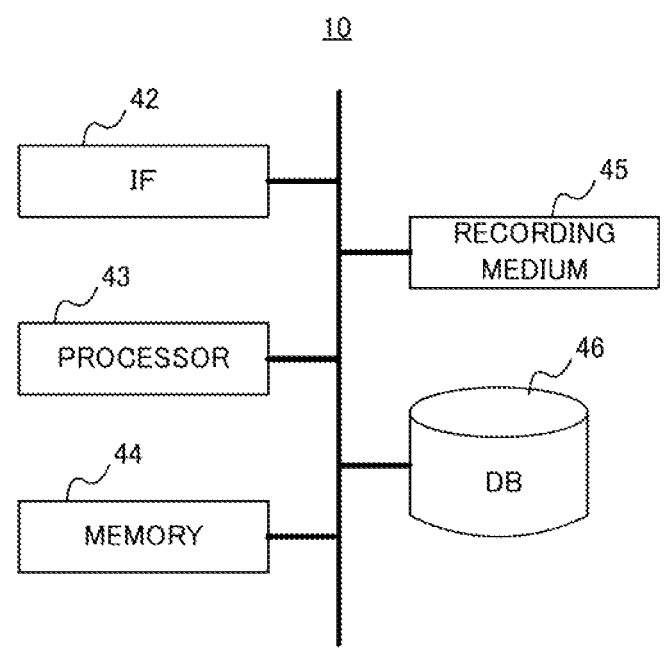
FIG. 4 is a block diagram illustrating a hardware configuration of an object detection device according to the first example embodiment.

FIG. 4 is a block diagram illustrating a hardware configuration of the object detection device according to the first example embodiment. The object detection device 10 corresponds to the above-described large-scale model. As illustrated, the object detection device 10 is provided with an interface (IF) 42, a processor 43, a memory 44, a recording medium 45, and a database (DB) 46.

The interface 42 communicates with an external device. Specifically, the interface 42 is used to input image data to be subjected to the object detection or image data for learning from an outside source, and to output an object detection result to an external device.

The processor 43 is a computer such as a CPU (Central Processing Unit) or a CPU and a GPU (Graphics Processing Unit), and controls the object detection device 10 as a whole by executing a program prepared in advance. The memory 44 includes ROM (Read Only Memory), RAM (Random Access Memory), and the like. The memory 44 stores various programs to be executed by the processor 43. The memory 44 is also used as a work memory when the processor 3 executes various processing.

The recording medium 45 is a non-volatile, non-transitory recording medium such as a disk-shaped recording medium or a semiconductor memory, and is configured to be removably attachable to the object detection device 10. The recording medium 45 records various programs executed by the processor 43. When the object detection device 10 executes a learning processing, a program recorded in the recording medium 45 is loaded into the memory 44 and executed by the processor 43.

The database 46 stores image data for learning that is used in the learning processing by the object detection device 10. The image data for learning includes ground truth labels. Note that in addition to the above, the object detection device 10 may also be provided with an input device such as keyboard and mouse, a display device, and the like.

First Example

Next, a description will be given of an object detection device according to a first example of the first example embodiment.

(Functional Configuration for Learning)

Figure 5:
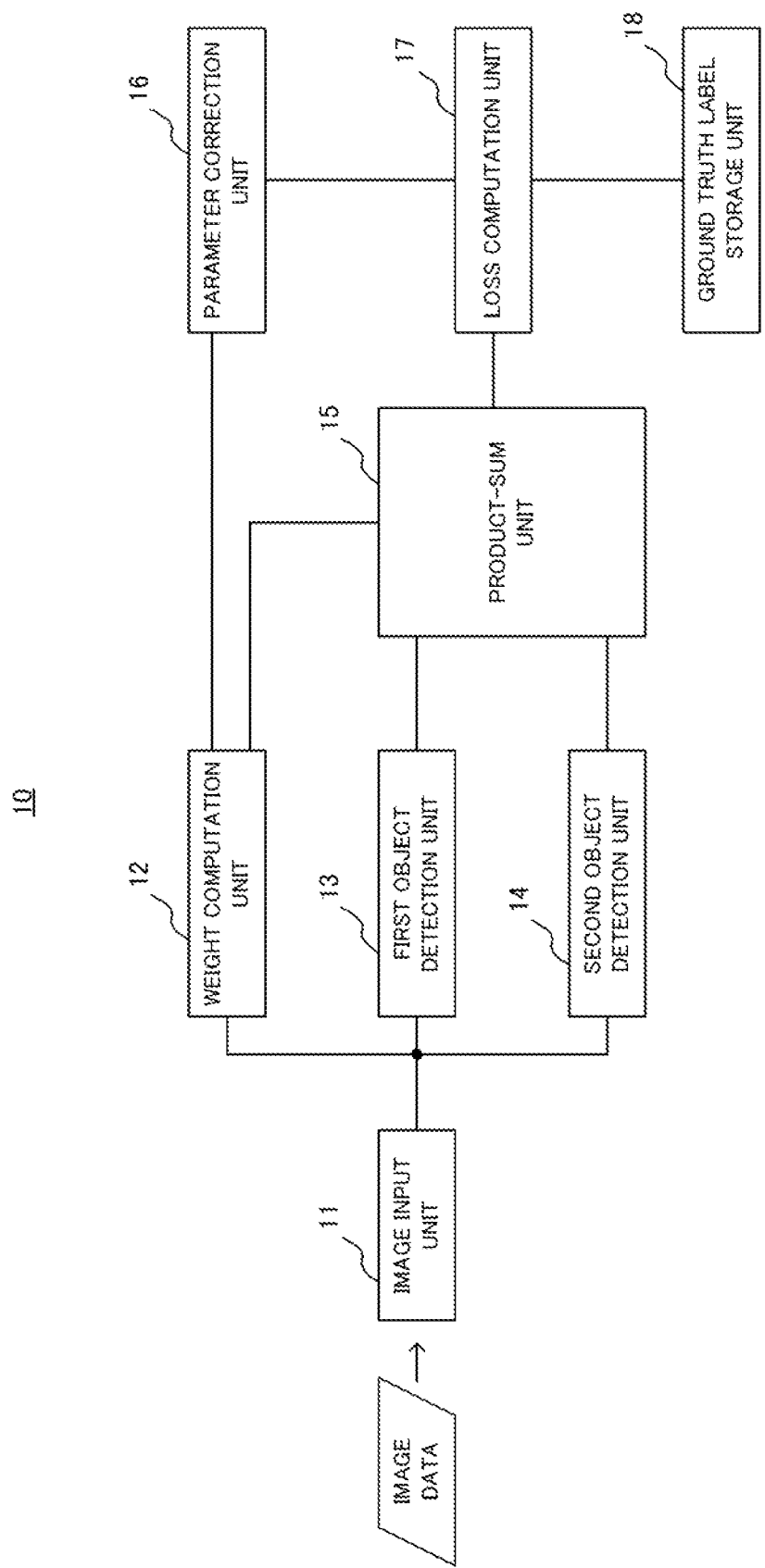
FIG. 5 illustrates a functional configuration of an object detection device for learning according to the first example embodiment.

First, a functional configuration of the object detection device 10 for learning according to the first example will be described. FIG. 5 is a block diagram illustrating a functional configuration of the object detection device 10 for learning. Note that FIG. 5 illustrates a configuration for executing a learning step of learning an optimal merging ratio of the outputs from a plurality of object detection units. As illustrated, the object detection device 10 is provided with an image input unit 11, a weight computation unit 12, a first object detection unit 13, a second object detection unit 14, a product-sum unit 15, a parameter correction unit 16, a loss computation unit 17, and a ground truth label storage unit 18. The image input unit 11 is realized by the interface 42 illustrated in FIG. 4, while the weight computation unit 12, the first object detection unit 13, the second object detection unit 14, the product-sum unit 15, the parameter correction unit 16, and the loss computation unit 17 are realized by the processor 43 illustrated in FIG. 4. The ground truth label storage unit 18 is realized by the database 46 illustrated in FIG. 4.

The learning step of the object detection device 10 optimizes the internal parameters for weight computation (hereinafter referred to as "weight computation parameters") in the weight computation unit 12. Note that the first object detection unit 13 and the second object detection unit 14 are pre-trained, and do not undergo learning in this learning step.

Image data is inputted into the image input unit 11. The image data is image data for learning, and is taken in an area to be subjected to object detection. As described above, a ground truth label indicating an object included in the image is prepared in advance for each image data.

The first object detection unit 13 has a configuration similar to a neural network for object detection by deep learning, such as Single Shot Multibox Detector (SSD), RetinaNet, or Faster-RCNN (Regional Convolutional Neural Network. However, the first object detection unit 13 does not perform a non-maximum suppression (NMS) processing to output detected objects with their scores and the coordinate information in a list format or the like, and simply outputs score information and the coordinate information for a recognition target object computed for each anchor box before the NMS processing. The first object detection unit 13 outputs the score information and the coordinate information for each anchor box to the weight computation unit 12 and the product-sum unit 15. As described above, the first object detection unit 13 is pre-trained in advance and its parameters are fixed. The learning of the first object detection unit 13 is not performed in the learning step of the object detection device 10.

The second object detection unit 14 is similar to the first object detection unit 13 and has the same model structure. However, the first object detection unit 13 and the second object detection unit 14 have different parameters in the respective internal networks due to such factors that the training data or the initial values of the parameters are different when learning was performed, and consequently have different recognition characteristics. The second object detection unit 14 outputs the score information and the coordinate information for each anchor box to the weight computation unit 12 and the product-sum unit 15.

The weight computation unit 12 is configured by a deep neural network or the like that is applicable to regression problems, such as ResNet (Residual Network). The weight computation unit 12 determines the weights with respect to image data inputted into the image input unit 11 when merging the score information and coordinate information outputted by the first object detection unit 13 and the second object detection unit 14, and outputs information indicating each of the weights to the product-sum unit 15. At that time, the weight computation unit 12 determines the weights based on the inputted image data and the outputs of the first object detection unit 13 and the second object detection unit 14 for the inputted image data. Basically, the number of dimensions of the weights is equal to the number of the object detection units used. In this case, the weight computation unit 12 preferably computes the weights such that the sum of the weight for the first object detection unit 13 and the weight for the second object detection unit 14 is "1". For example, the weight computation unit 12 may set the weight for the first object detection unit 13 to "α", and set the weight for the second object detection unit 14 to "1−α". With this arrangement, an averaging processing in the product-sum unit 15 can be simplified. Note that in the case where there are two parameters related to a single object in the object detection units (for example, a parameter indicating the probability of a certain object and a parameter indicating the improbability of a certain object), the number of dimensions of the weights is double the number of object detection units used.

The product-sum unit 15 computes the product-sums of the score information and the coordinate information outputted by the first object detection unit 13 and the second object detection unit 14 for respectively corresponding anchors on the basis of the weights outputted by the weight computation unit 12, and then calculates an average value. Note that the product-sum operation on the coordinate information is only performed on the anchors for which the existence of a recognition target object is indicated by the ground truth label, and calculation is unnecessary for all other anchors. The average value is computed for each anchor and each recognition target object, and has Na×(k+4) dimensions. Note that the product-sum unit 15 is one example of a merging unit.

The ground truth label storage unit 18 stores ground truth labels with respect to the image data for learning. Specifically, the ground truth label storage unit 18 stores the class information and the coordinate information about the recognition target object existing at each anchor in an array for each anchor as the ground truth labels. The ground truth label storage unit 18 stores the class information indicating that a recognition target object does not exist and the coordinate information in the storage areas corresponding to the anchors where a recognition target object does not exist. The class information includes a class code indicating the type of object and score information indicating the probability that an object indicated by the class code exists. Note that in many cases, the original ground truth information with respect to the image data for learning is text information indicating the type and rectangular region of a recognition target object appearing in an input image, but the ground truth labels stored in the ground truth label storage unit 18 are data obtained by converting such ground truth information into the class information and the coordinate information for each anchor.

For example, for an anchor that overlaps by a predetermined threshold or more with the rectangular region in which a certain object appears, the ground truth label storage unit 18 stores a value of 1.0 indicating the score of the object as the class information at the location of the ground truth label expressing the score of the object, and stores relative quantities of the position (an x-coordinate offset from the left edge, a y-coordinate offset from the top edge, a width offset, and a height offset) of the rectangular region in which the object appears with respect to a standard rectangular position of the anchor as the coordinate information. In addition, the ground truth label storage unit 18 stores a value indicating that an object does not exist at the location of the ground truth label expressing the scores for other objects. Also, for an anchor that does not overlap by a predetermined threshold or more with the rectangular region in which a certain object appears, the ground truth label storage unit 18 stores a value indicating that an object does not exist at the location of the ground truth label where the score and coordinate information of the object are stored. For a single anchor, the class information is k-dimensional, and the coordinate information is 4-dimensional. For all anchors, the class information is (Na×k)-dimensional and the coordinate information is (Na×4)-dimensional. To this conversion, it is possible to apply methods used by deep neural network programs for object detection tasks and generally available to the public.

The loss computation unit 17 checks the score information and coordinate information of (Na×(k+4))-dimension outputted by the product-sum unit 15 with the ground truth labels stored in the ground truth label storage unit 18 to compute a loss value. Specifically, the loss computation unit 17 computes an identification loss related to the score information and a regression loss related to the coordinate information. The (Na×(k+4))-dimensional average value outputted by the product-sum unit 15 is defined in the same way as the score information and coordinate information that the first object detection unit 13 outputs for each anchor and each recognition target object. Consequently, the loss computation unit 17 can compute the value of the identification loss by a method that is exactly the same as the method of computing the identification loss with respect to the output of the first object detection unit 13. The loss computation unit 17 computes the cumulative differences of the score information with respect to all anchors as the identification loss. Also, for the regression loss, the loss computation unit 17 computes the cumulative differences of the coordinate information only with respect to the anchors where an object exists, and does not consider the difference of the coordinate information with respect to the anchors where no object exists.

Note that deep neural network learning using identification loss and regression loss is described in the following document, which is incorporated herein as a reference.

"Learning Efficient Object Detection Models with Knowledge Distillation", NeurIPS 2017

The parameter correction unit 16 corrects the parameters of the network in the weight computation unit 12 so as to reduce the loss computed by the loss computation unit 17. At this time, the parameter correction unit 16 fixes the parameters of the networks in the first object detection unit 13 and the second object detection unit 14, and only corrects the parameters of the weight computation unit 12. The parameter correction unit 16 can compute parameter correction quantities by ordinary error backpropagation. By learning the parameters of the weight computation unit 12 in this way, it is possible to construct an object detection device that optimally computes the product-sums of the outputs from the first object detection unit 13 and the second object detection unit 14 to make an overall determination. The loss computation unit 17 is an example of a first loss computation unit, the loss computed by the loss computation unit 17 is an example of a first loss, and the parameter correction unit 16 is an example of a first parameter correction unit.

Figure 6:
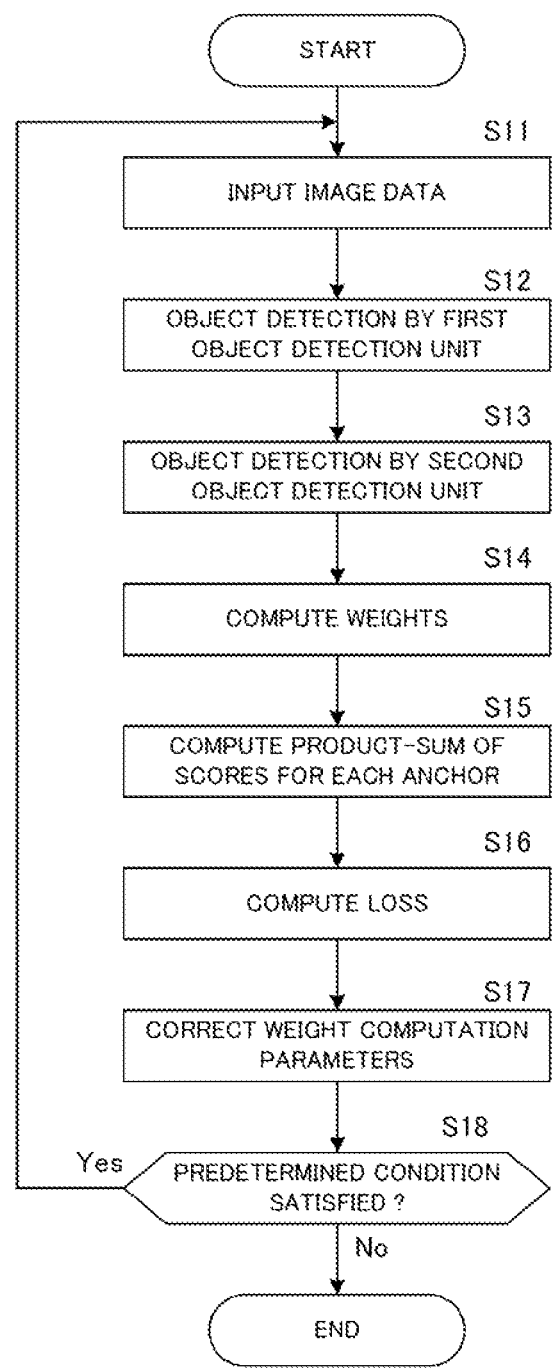
FIG. 6 is a flowchart of learning processing by the object detection device according to the first example.

Next, operations by the object detection device 10 for learning will be described. FIG. 6 is a flowchart of a learning processing by the object detection device 10. This processing is achieved by causing the processor 3 illustrated in FIG. 1 to execute a program prepared in advance.

First, image data for learning is inputted into the image input unit 11 (step S11). The first object detection unit 13 performs object detection using the image data, and outputs the score information and the coordinate information about the recognition target objects in the images for each anchor and each recognition target object (step S12). Similarly, the second object detection unit 14 performs object detection using the image data, and outputs the score information and the coordinate information about the recognition target objects in the images for each anchor and each recognition target object (step S13). Also, the weight computation unit 12 receives the image data and computes the weights with respect to each of the outputs from the first object detection unit 13 and the second object detection unit 14 (step S14).

Next, the product-sum unit 15 multiplies the score information and coordinate information about recognition target objects outputted by the first object detection unit 13 and the score information and coordinate information about recognition target objects outputted by the second object detection unit 14 by the respective weights computed by the weight computation unit 12, and adds the results together to output the average value (step S15). Next, the loss computation unit 17 checks the difference between the obtained average value and the ground truth labels, and computes the loss (step S16). Thereafter, the parameter correction unit 16 corrects the weight computation parameters in the weight computation unit 12 to reduce the value of the loss (step S17).

The object detection device 10 repeats the above steps S11 to S17 while a predetermined condition holds true, and then ends the process. Note that the "predetermined condition" is a condition related to the number of repetitions, the degree of change in the value of the loss, or the like, and any method widely adopted as a learning procedure for deep learning can be used.

As described above, according to the object detection device 10 of the first example, the weight computation unit 12 predicts what each object detection unit is good or poor at with respect to the input image to optimize the weights, multiplies the weights by the output from each object detection unit, and averages the results. Consequently, a final determination can be made with high accuracy compared to a standalone object detection unit. For example, in the case where the first object detection unit 13 is good at detecting a pedestrian walking alone and the second object detection unit 14 is good at detecting pedestrians walking in a group, if a person walking alone happens to appear in an input image, the weight computation unit 12 assigns a larger weight to the first object detection unit 13. The parameter correction unit 16 corrects the parameters of the weight computation unit 12 such that the weight computation unit 12 computes a large weight for the object detection unit that is good at recognizing the image data for learning.

(Functional Configuration for Inference)

Figure 7:
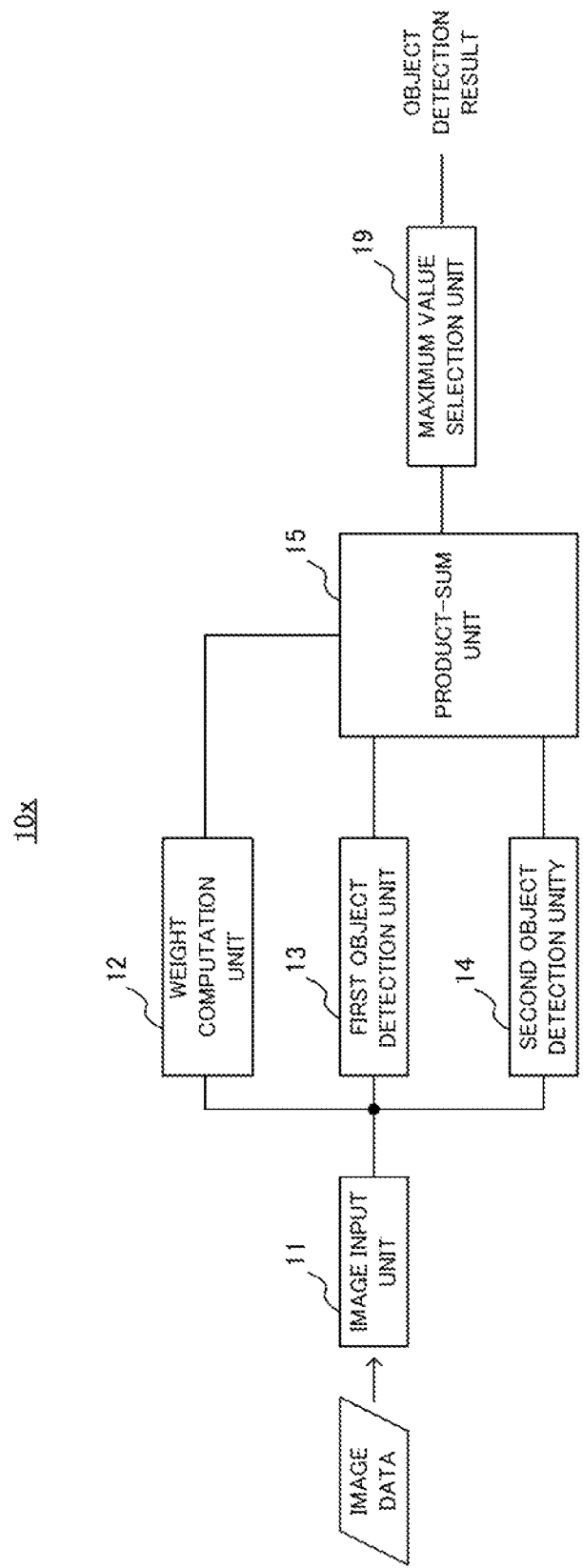
FIG. 7 illustrates a functional configuration of an object detection device for inference according to the first example.

Next, a functional configuration of an object detection device for inference will be described. FIG. 7 is a block diagram illustrating a functional configuration of an object detection device 10x for inference according to the first example. Note that the object detection device 10x for inference is also basically achieved with the hardware configuration illustrated in FIG. 4.

As illustrated in FIG. 7, the object detection device 10x for inference is provided with an image input unit 11, a weight computation unit 12, a first object detection unit 13, a second object detection unit 14, a product-sum unit 15, and a maximum value selection unit 19. Here, the image input unit 11, the weight computation unit 12, the first object detection unit 13, the second object detection unit 14, and the product-sum unit 15 are similar to the object detection device 10 for learning illustrated in FIG. 5. Also, the weight computation unit that has been trained by the above learning processing is used as the weight computation unit 12.

The maximum value selection unit 19 performs an NMS process on the (Na×k)-dimensional score information outputted by the product-sum unit 15 to identify the type of a recognition target object, specifies the position from the coordinate information corresponding to the anchor, and outputs an object detection result. The object detection result includes the type and position of each recognition target object. With this arrangement, it is possible to obtain an object detection result when the outputs from the first object detection unit 13 and the second object detection unit 14 are optimally merged to make an overall determination.

Figure 8:
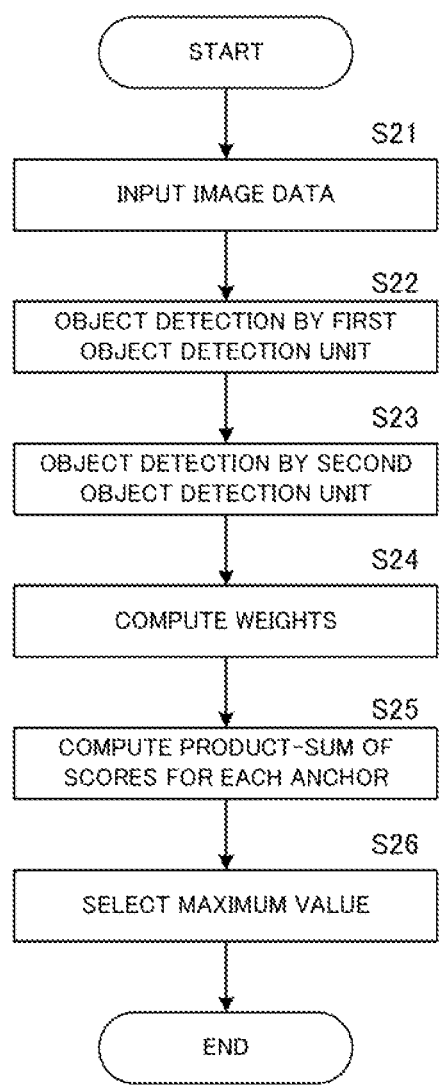
FIG. 8 is a flowchart of inference processing by the object detection device according to the first example.

Next, operations by the object detection device 10x for inference will be described. FIG. 8 is a flowchart of an inference processing by the object detection device 10x. This processing is achieved by causing the processor 3 illustrated in FIG. 4 to execute a program prepared in advance.

First, image data for inference is inputted into the image input unit 11 (step S21). The first object detection unit 13 performs object detection using the image data, and outputs the score information and the coordinate information about recognition target objects in the images for each anchor and each recognition target object (step S22). Similarly, the second object detection unit 14 performs object detection using the image data, and outputs the score information and the coordinate information about recognition target objects in the images for each anchor and each recognition target object (step S23). The weight computation unit 12 computes weights with respect to each of the outputs from the first object detection unit 13 and the second object detection unit 14 based on the image data and the outputs from the first object detection unit and the second object detection unit 14 (step S24).

Next, the product-sum unit 15 multiplies the score information and the coordinate information about recognition target objects outputted by the first object detection unit 13 and the score information and the coordinate information about recognition target objects outputted by the second object detection unit 14 by the respective weights computed by the weight computation unit 12, and adds the results together to output the average value (step S25). Finally, the maximum value selection unit 19 performs the NMS processing on the average value, and outputs the type and position of the recognition target object as an object detection result (step S26).

(Modifications)

The following modifications can be applied to the first example described above.

(1-1) In the first example described above, learning is performed using the score information and the coordinate information outputted by each object detection unit. However, learning may also be performed using only the score information, without using the coordinate information.

(1-2) In the first example described above, the two object detection units of the first object detection unit 13 and the second object detection unit 14 are used. However, using three or more object detection units poses no problem in principle. In that case, it is sufficient if the dimensionality (number) of the weights outputted by the weight computation unit 12 is equal to the number of the object detection units.

(1-3) Any deep learning method for object detection may be used as the specific algorithm forming the first object detection unit 13 and the second object detection unit 14. Moreover, the weight computation unit 12 is not limited to deep learning for regression problems, and any function that can be learned by error backpropagation may be used. In other words, any error function that is partially differentiable by the parameters of a function that computes weights may be used.

(1-4) Additionally, while the first example described above is directed to the object detection device, it is not limited to the detection of objects, and it may also be configured as an event detection device that outputs event information and coordinate information about an event occurring in an image. An "event" refers to something determined in advance, such as a behavior, movement, or gesture by a person or a natural phenomenon such as a mudslide, an avalanche, or a rise in the water level of a river, for example.

(1-5) In the first example described above, while object detection units having the same model structure are used as the first object detection unit 13 and the second object detection unit 14, different models may also be used. In such a case, it is necessary to devise associations in the product-sum unit 15 between the anchors of both models corresponding to substantially the same positions. This is because the anchors of different models do not match exactly. As a practical implementation, each anchor set in the second object detection unit 14 may be associated with one of the anchors set in the first object detection unit 13, a weighted average may be calculated for each anchor set in the first object detection unit 13, and score information and coordinate information may be outputted for each anchor and each recognition target object set in the first object detection unit 13. The anchor associations may be determined by calculating image regions corresponding to anchors (rectangular regions where an object exists) and associating the anchors for which image regions appropriately overlap each other.

Second Example

Next, a second example of the first example embodiment will be described. Note that the object detection device 20 for learning and the object detection device 20x for inference described below are both achieved with the hardware configuration illustrated in FIG. 4.

(Functional Configuration for Learning)

Figure 9:
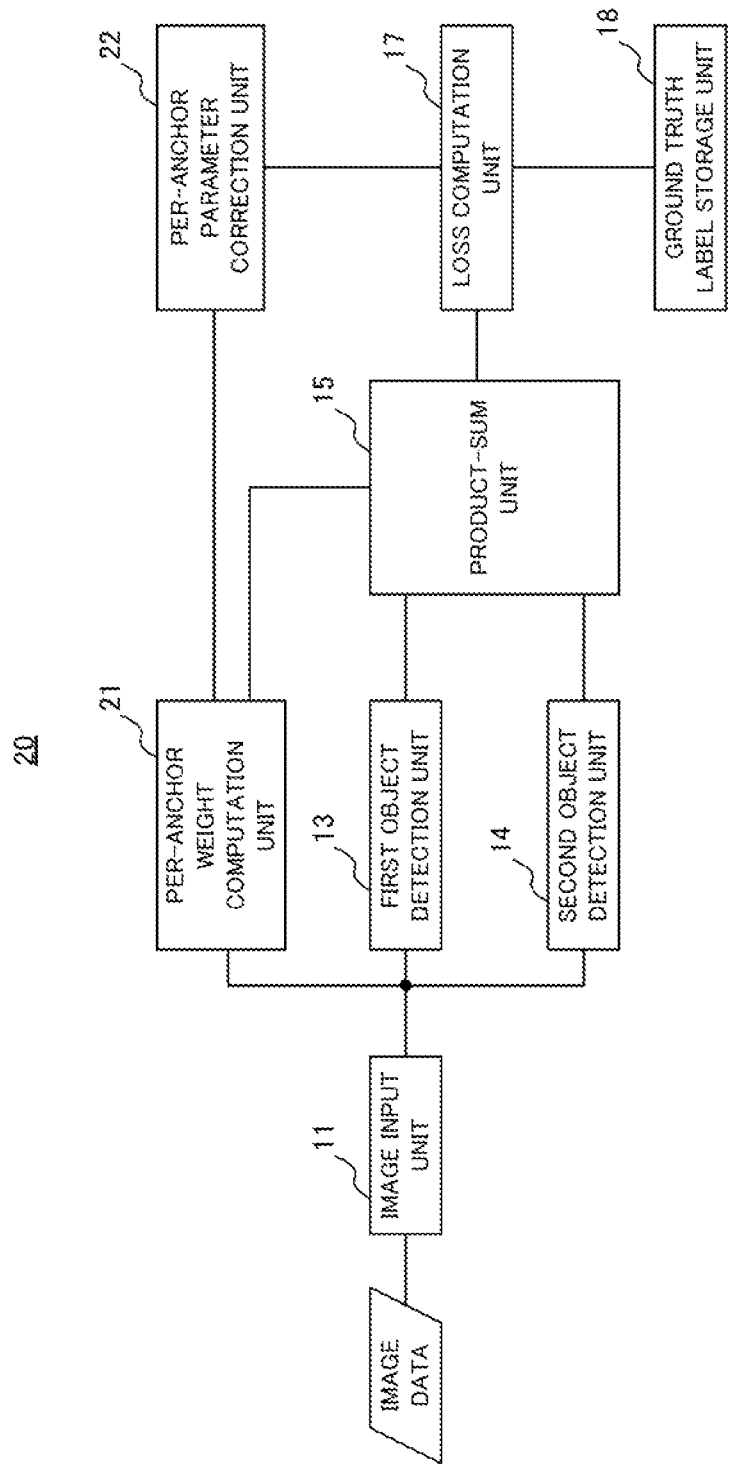
FIG. 9 illustrates a functional configuration of an object detection device for learning according to a second example.

FIG. 9 is a block diagram illustrating a functional configuration of an object detection device 20 for learning according to the second example. As illustrated, the object detection device 20 for learning includes a per-anchor weight computation unit 21 and a per-anchor parameter correction unit 22 instead of the weight computation unit 12 and the parameter correction unit 16 in the object detection device 10 illustrated in FIG. 2. Otherwise, the object detection device 20 according to the second example is the same as the object detection device 10 according to the first example. In other words, the image input unit 11, the first object detection unit 13, the second object detection unit 14, the product-sum unit 15, the loss computation unit 17, and the ground truth label storage unit 18 are the same as the respective units of the object detection device 10 according to the first example, and basically operate similarly to the first example.

The per-anchor weight computation unit 21 computes weights with respect to the first object detection unit 13 and the second object detection unit 14 for each anchor set in image data inputted into the image input unit 11 on the basis of the image data and the outputs of the first object detection unit 13 and the second object detection unit, and outputs the computed weights to the product-sum unit 15. Namely, whereas the weight computation unit 12 according to the first example embodiment sets a single weight for the image as a whole with respect to the output of each object detection unit, the per-anchor weight computation unit 21 according to the second example embodiment computes a weight for each anchor with respect to the output of each object detection unit, that is, for each partial region of the image. Supposing that the number of anchors set in the image data is Na and the number of object detection units is Nf, the number of dimensions of the information indicating the weight outputted by the per-anchor weight computation unit 21 is Na×Nf dimensions. The per-anchor weight computation unit 21 can be configured by a deep neural network applicable to multidimensional regression problems or the like. Also, the per-anchor weight computation unit 21 may include a network having a structure that averages the weights corresponding to nearby anchors, such that nearby anchors for respective object detection units have weights that are as close to each other as possible.

The product-sum unit 15 computes the product-sums of the score information and the coordinate information outputted for each anchor and each recognition target object by each of the first object detection unit 13 and the second object detection unit 14 on the basis of the weights for each object detection unit and each anchor outputted by the per-anchor weight computation unit 21 while associating the same information with each other, and then calculates an average value. The number of dimensions of the average value is Na×(k+4) dimensions, which is the same as the first example.

The per-anchor parameter correction unit 22 corrects the weight computation parameters for each object detection unit and each anchor in the per-anchor weight computation unit 21 so as to reduce the loss computed by the loss computation unit 17. At this time, like the first example, the parameters of the networks in the first object detection unit 13 and the second object detection unit 14 are fixed, and the per-anchor parameter correction unit 22 only corrects the parameters of the per-anchor weight computation unit 21. The parameter correction quantities can be computed by ordinary error backpropagation.

During learning, the object detection device 20 according to the second example executes the processing basically the same as the learning processing according to the first example illustrated in FIG. 6. However, in the second example embodiment, the per-anchor weight computation unit 21 computes the weights with respect to the output from each object detection unit for each anchor in step S14 of the learning processing illustrated in FIG. 6. Also, in step S17, the per-anchor parameter correction unit 22 corrects the weight computation parameters in the per-anchor weight computation unit 21 for each anchor.

(Functional Configuration for Inference)

Figure 10:
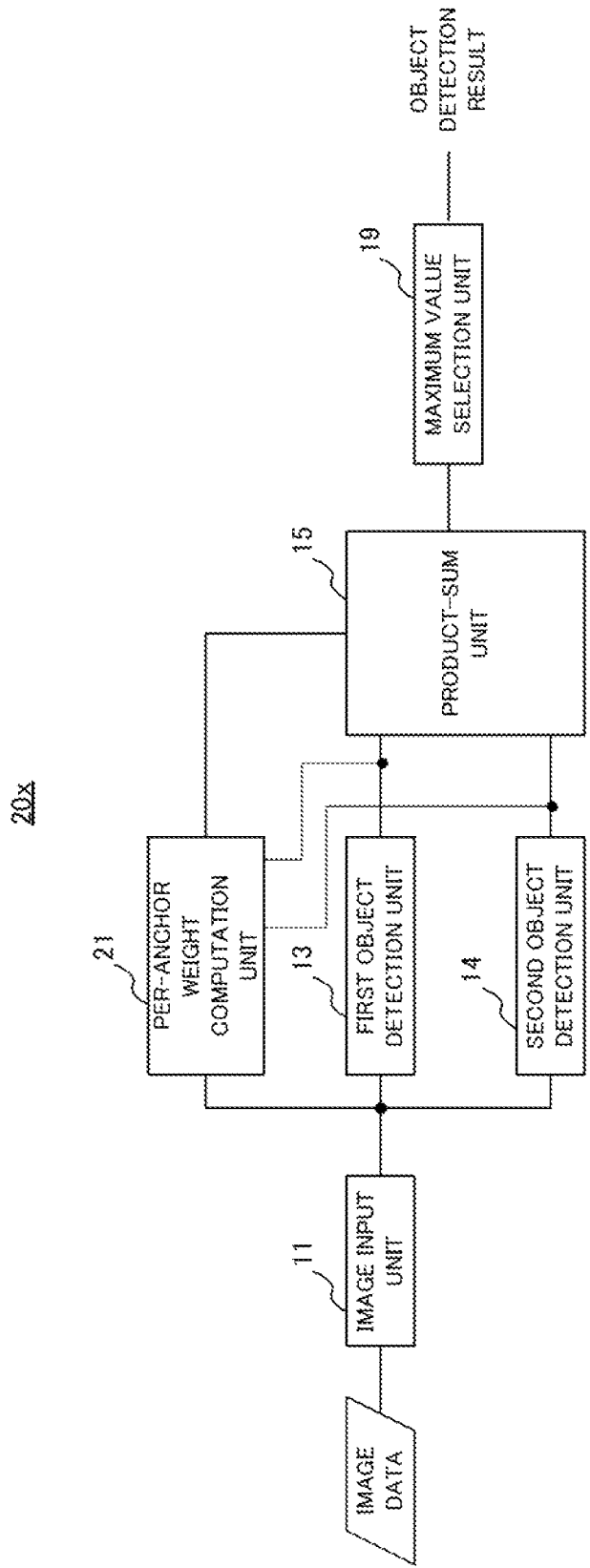
FIG. 10 illustrates a functional configuration of an object detection device for inference according to the second example.

Next, a configuration of an object detection device for inference according to the second example will be described. FIG. 10 is a block diagram illustrating a functional configuration of the object detection device 20x for inference according to the second example. The object detection device 20x for inference according to the second example includes a per-anchor weight computation unit 21 instead of the weight computation unit 12 in the object detection device 10x for inference according to the first example illustrated in FIG. 7. Otherwise, the object detection device 20x for inference according to the second example is the same as the object detection device 10x for inference according to the first example. Consequently, in the second example, the per-anchor weight computation unit 21 computes the weights for each anchor and outputs them to the first object detection unit 13 and the second object detection unit 14.

During inference, the object detection device 20x according to the second example executes the processing basically the same as the inference processing according to the first example illustrated in FIG. 8. However, in the second example, the per-anchor weight computation unit 21 computes the weights with respect to the output from each object detection unit for each anchor in step S24 of the inference processing illustrated in FIG. 8.

In the second example, weights are computed on the basis of inputted image data by estimating the probability of the output from each object detection unit for each anchor, i.e., for each location, and the weights are used to calculate a weighted average of the outputs from the object detection units. Consequently, the outputs from a plurality of object detection units can be used to make a more accurate final determination. For example, it is assumed that the first object detection unit 13 is good at detecting a pedestrian walking alone and the second object detection unit 14 is good at detecting pedestrians walking in a group. If a person walking alone and persons walking in a group both appear in an inputted image, the per-anchor weight computation unit 21 outputs weights that give more importance on the output from the first object detection unit 13 for the anchors corresponding to the region near the position of the person walking alone and give more importance on the output from the second object detection unit 14 for the anchors corresponding to the region near the position of the persons walking in a group. In this way, a more accurate final determination becomes possible. Furthermore, the per-anchor parameter correction unit 22 can correct the parameters for each partial region of the image such that the per-anchor weight computation unit 21 outputs weights that give more importance on the output from the object detection unit that is good at recognizing the image data for learning.

(Modifications)

The modifications (1-1) to (1-5) of the first example described above can also be applied to the second example. Furthermore, the following modification (1-66) can be applied to the second example.

(1-6) In the second example described above, the per-anchor weight computation unit 21 computes optimal weights for each anchor. However, if the object detection units have different binary classifiers for each class like in RetinaNet for example, the weights may be changed for each class rather than for each anchor. In this case, a per-class weight computation unit may be provided instead of the per-anchor weight computation unit 21, and a per-class parameter correction unit may be provided instead of the per-anchor parameter correction unit 22. Provided that the number of anchors set in the image data is Na and the number of object detection units is Nf, the number of dimensions of the weights outputted by the per-anchor weight computation unit 21 is Na×Nf dimensions. On the other hand, provided that the number of classes is Nc dimensions, the number of dimensions of the weights outputted by the per-class weight computation unit is Nc×Nf dimensions. To learn the parameters of the per-class weight computation unit by the per-class parameter correction unit, it is sufficient to apply backpropagation so as to minimize the loss from the output layer neuron side as usual. According to this configuration, in the case where the respective object detection units are good at detecting different classes, for example, it is possible to compute different optimal weights for each class.

Third Example

Next, a third example of the first example embodiment will be described. The third example uses shooting environment information about the image data to compute weights for each object detection unit. Note that the object detection device 30 for learning and the object detection device 30x for inference described below are both achieved with the hardware configuration illustrated in FIG. 4.

(Functional Configuration for Learning)

Figure 11:
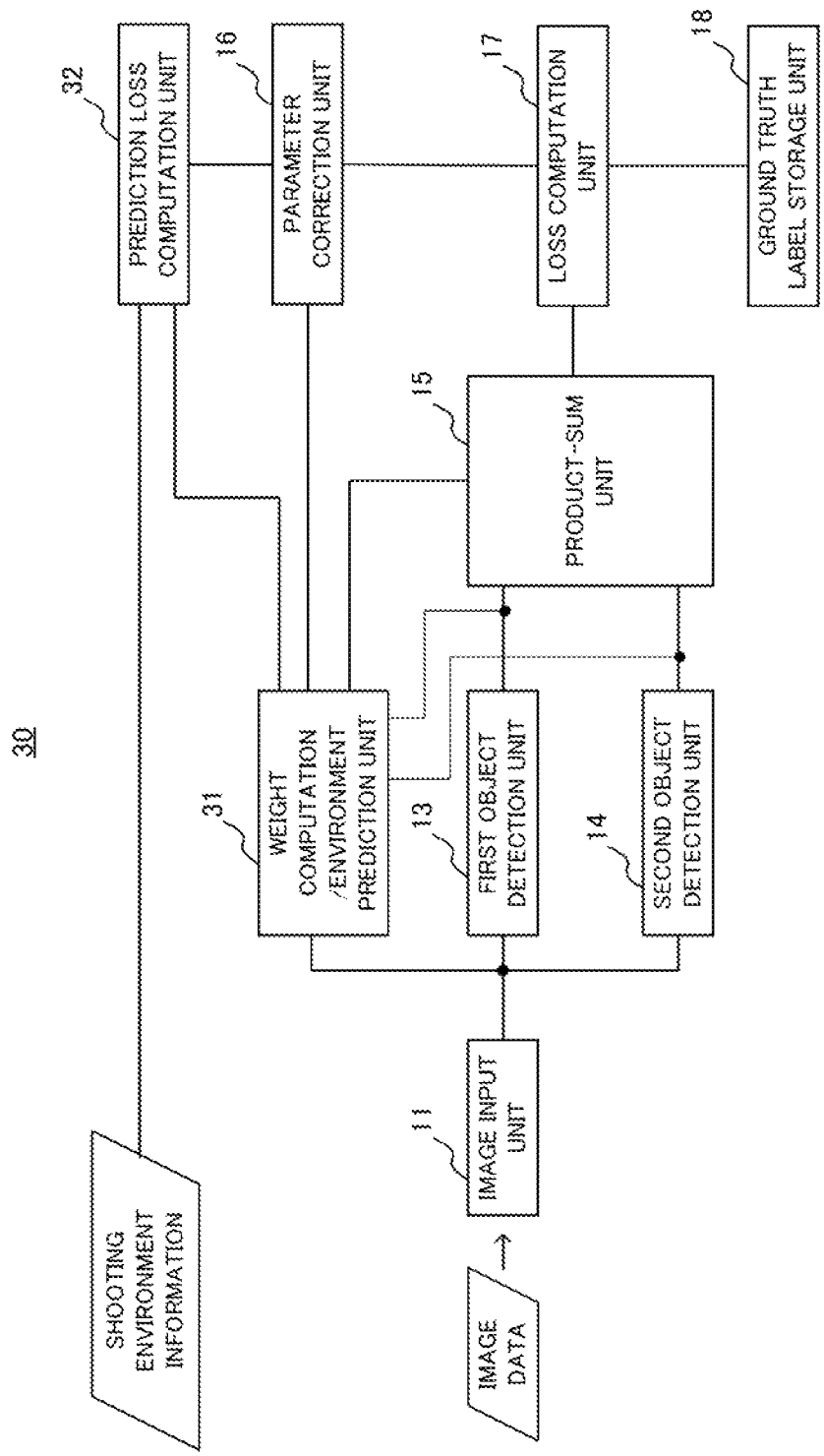
FIG. 11 illustrates a functional configuration of an object detection device for learning according to a third example.

FIG. 11 is a block diagram illustrating a functional configuration of an object detection device 30 for learning according to the third example. As illustrated, the object detection device 30 for learning is provided with a weight computation/environment prediction unit 31 instead of the weight computation unit 12 in the object detection device 10 illustrated in FIG. 5, and additionally includes a prediction loss computation unit 32. Otherwise, the object detection device 30 according to the third example is the same as the object detection device 10 according to the first example. In other words, the image input unit 11, the first object detection unit 13, the second object detection unit 14, the product-sum unit 15, the loss computation unit 17, and the ground truth label storage unit 18 are the same as the respective units of the object detection device 10 according to the first example, and basically operate similarly to the first example embodiment.

Shooting environment information is inputted into the prediction loss computation unit 32. The shooting environment information is information indicating the environment where the image data inputted into the image input unit 11 was shot. For example, the shooting environment information is information such as (a) an indication of the installation location (indoors or outdoors) of the camera used to acquire the image data, (b) the weather at the time (sunny, cloudy, rainy, or snowy), (c) the time (daytime or nighttime), and (d) the tilt angle of the camera (0-30 degrees, 30-60 degrees, or 60-90 degrees).

The weight computation/environment prediction unit 31 uses weight computation parameters to compute weights with respect to the first object detection unit 13 and the second object detection unit 14 based on the image data inputted to the image input unit 11 and the outputs of the first object detection unit 13 and the second object detection unit 14. Also, the weight computation/environment prediction unit 31 uses parameters for predicting the shooting environment (hereinafter referred to as "shooting environment prediction parameters") to predict the shooting environment of the inputted image data, and generates and outputs the predicted environment information to the prediction loss computation unit 32. For example, if the four types of information (a) to (d) mentioned above are used as the shooting environment information, the weight computation/environment prediction unit 31 expresses an attribute value indicating the information of each type in one dimension, and outputs a four-dimensional value as the predicted environment information. The weight computation/environment prediction unit 31 uses some of the calculations in common when computing the weights and the predicted environment information. For example, in the case of computation using a deep neural network, the weight computation/environment prediction unit 31 uses the lower layers of the network in common, and only the upper layers are specialized for computing the weights and the predicted environment information. In other words, the weight computation/environment prediction unit 31 performs what is called multi-task learning. With this arrangement, the weight computation parameters and the environment prediction parameters have a portion shared in common.

The prediction loss computation unit 32 calculates the difference between the shooting environment information and the predicted environment computed by the weight computation/environment prediction unit 31, and outputs the difference to the parameter correction unit 16 as a prediction loss. The parameter correction unit 16 corrects the parameters of the network in the weight computation/environment prediction unit 31 so as to reduce the loss computed by the loss computation unit 17 and the prediction loss computed by the prediction loss computation unit 32.

In the third example, since a portion of the network is shared between the computation of the weights and the computation of the predicted environment information in the weight computation/environment prediction unit 31, models of similar shooting environments tend to have similar weights. As a result, an effect of making the learning in the weight computation/environment prediction unit 31 more consistent is obtained.

Note that in the third example described above, the weight computation/environment prediction unit 31 and the parameter correction unit 16 compute equal weights with respect to the entire image, similarly to the first example. Instead, the weight computation/environment prediction unit 31 and the parameter correction unit 16 may be configured to compute weights for each anchor (each partial region) like the second example.

Figure 12:
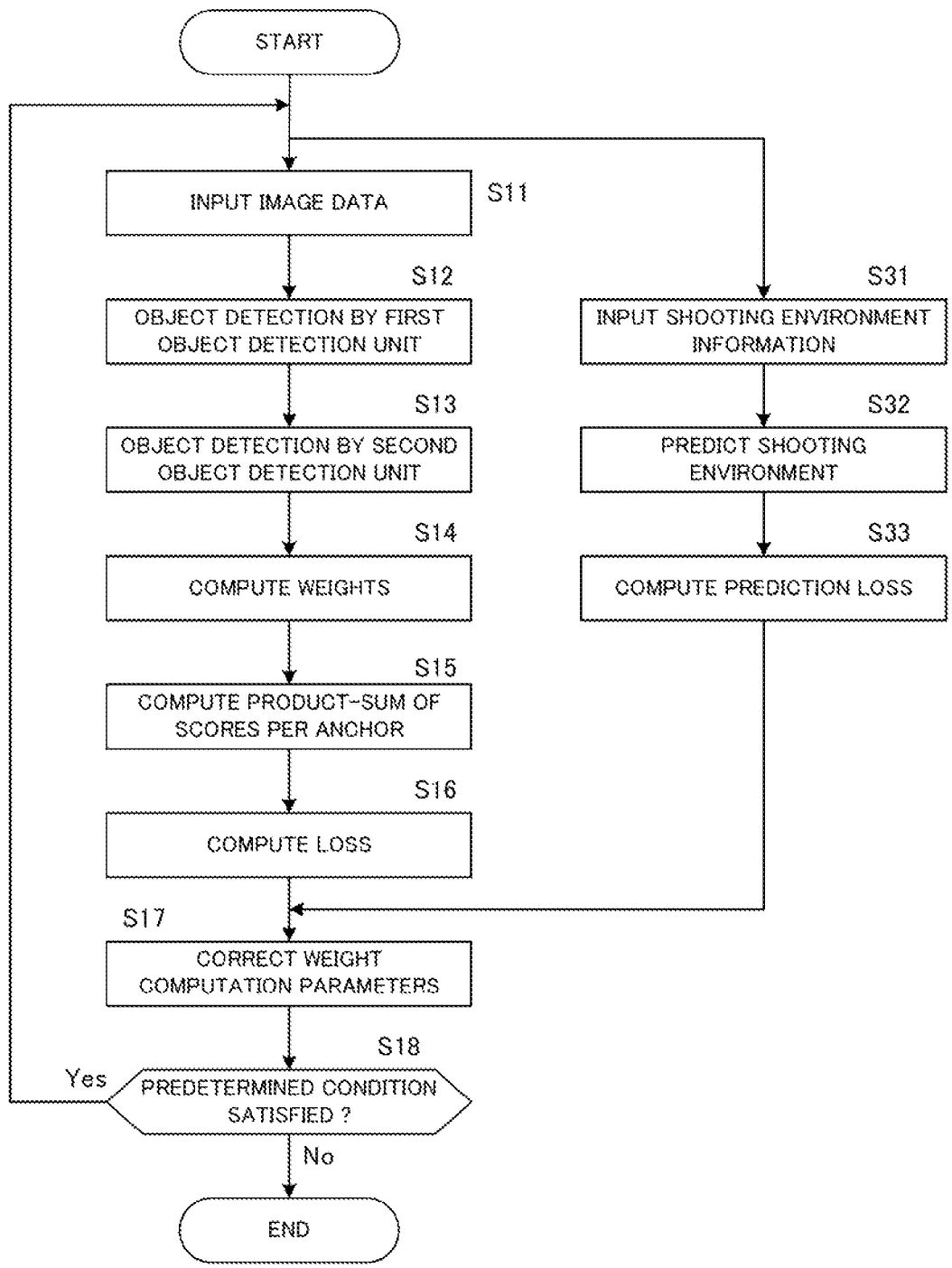
FIG. 12 is a flowchart of learning processing by the object detection device according to the third example.

Next, operations by the object detection device 30 for learning will be described. FIG. 12 is a flowchart of the learning processing by the object detection device 30 according to the third example. This processing is achieved by causing the processor 43 illustrated in FIG. 4 to execute a program prepared in advance. As understood from the comparison with FIG. 6, in the learning processing by the object detection device 30 according to the third example, steps S31 to S33 are added to the learning processing by the object detection device 10 according to the first example.

In FIG. 12, steps S11 to S16 are the same as the learning processing according to the first example. In step S16, the loss computation unit 17 checks the difference between the obtained average value and the ground truth labels, and computes and outputs the loss to the parameter correction unit 16. Meanwhile, steps S31 to S33 are executed in parallel with steps S11 to S16. Specifically, first, shooting environment information is inputted into the prediction loss computation unit 32 (step S31). Next, on the basis of the image data outputted from the image input unit 11, the weight computation/environment prediction unit 31 predicts the environment where the image data was acquired, and generates and outputs the predicted environment information to the prediction loss computation unit 32 (step S32). The prediction loss computation unit 32 computes the prediction loss on the basis of the shooting environment information inputted in step S31 and the predicted environment information inputted in step S32, and outputs the prediction loss to the parameter correction unit 16 (step S33). Then, the parameter correction unit 16 corrects the parameters in the weight computation/environment prediction unit 31 so as to reduce the value of the loss computed by the loss computation unit 17 and the prediction loss computed by the prediction loss computation unit 32 (step S17). The object detection device 30 repeats the above steps S11 to S17 and S31 to S33 while a predetermined condition holds true, and then ends the processing.

(Functional Configuration for Inference)

Figure 13:
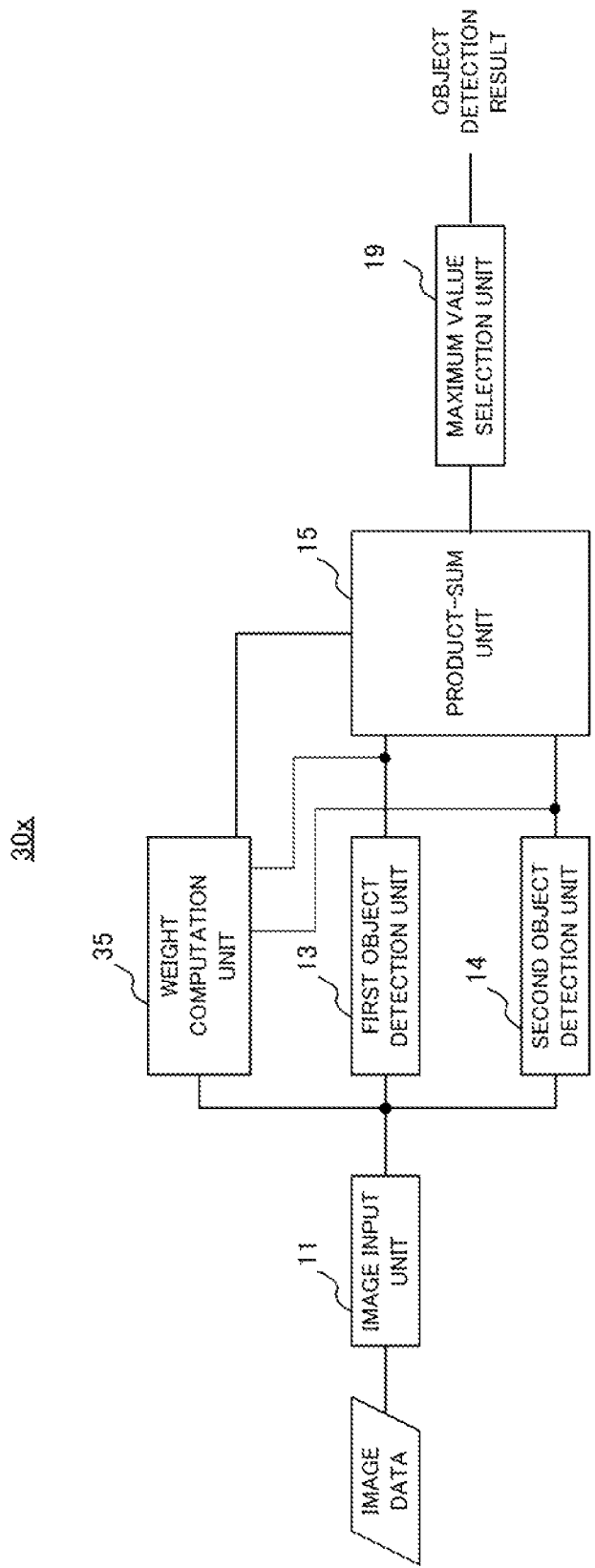
FIG. 13 illustrates a functional configuration of an object detection device for inference according to the third example.

Next, a configuration of an object detection device for inference according to the third example will be described. FIG. 13 is a block diagram illustrating a functional configuration of the object detection device 30x for inference according to the third example. The object detection device 30x for inference according to the third example includes a weight computation unit 35 instead of the weight computation unit 12 in the object detection device 10x for inference according to the first example illustrated in FIG. 7. Otherwise, the object detection device 30x for inference according to the third example is the same as the object detection device 10x for inference according to the first example.

During inference, the object detection device 30x according to the third example executes processing basically similar to the learning processing according to the first example illustrated in FIG. 7. However, in the third example, the weight computation unit 35 uses internal parameters learned using the shooting environment information by the object detection device 30 for learning described above to compute weights with respect to the first object detection unit 13 and the second object detection unit 14, and inputs the computed weights into the product-sum unit 15. Otherwise, the object detection device 30x according to the third example operates similarly to the object detection device 10x according to the first example. Consequently, the object detection device 30x according to the third example performs inference processing following the flowchart illustrated in FIG. 8, similarly to the object detection device 10x according to the first example. However, in step S24, the weight computation unit 35 computes the weights using internal parameters learned using the shooting environment information.

(Modifications)

The modifications (1-1) to (1-5) of the first example described above can also be applied to the third example.

Second Example Embodiment

Next, a second example embodiment will be described.

(Principle)

Figure 14:
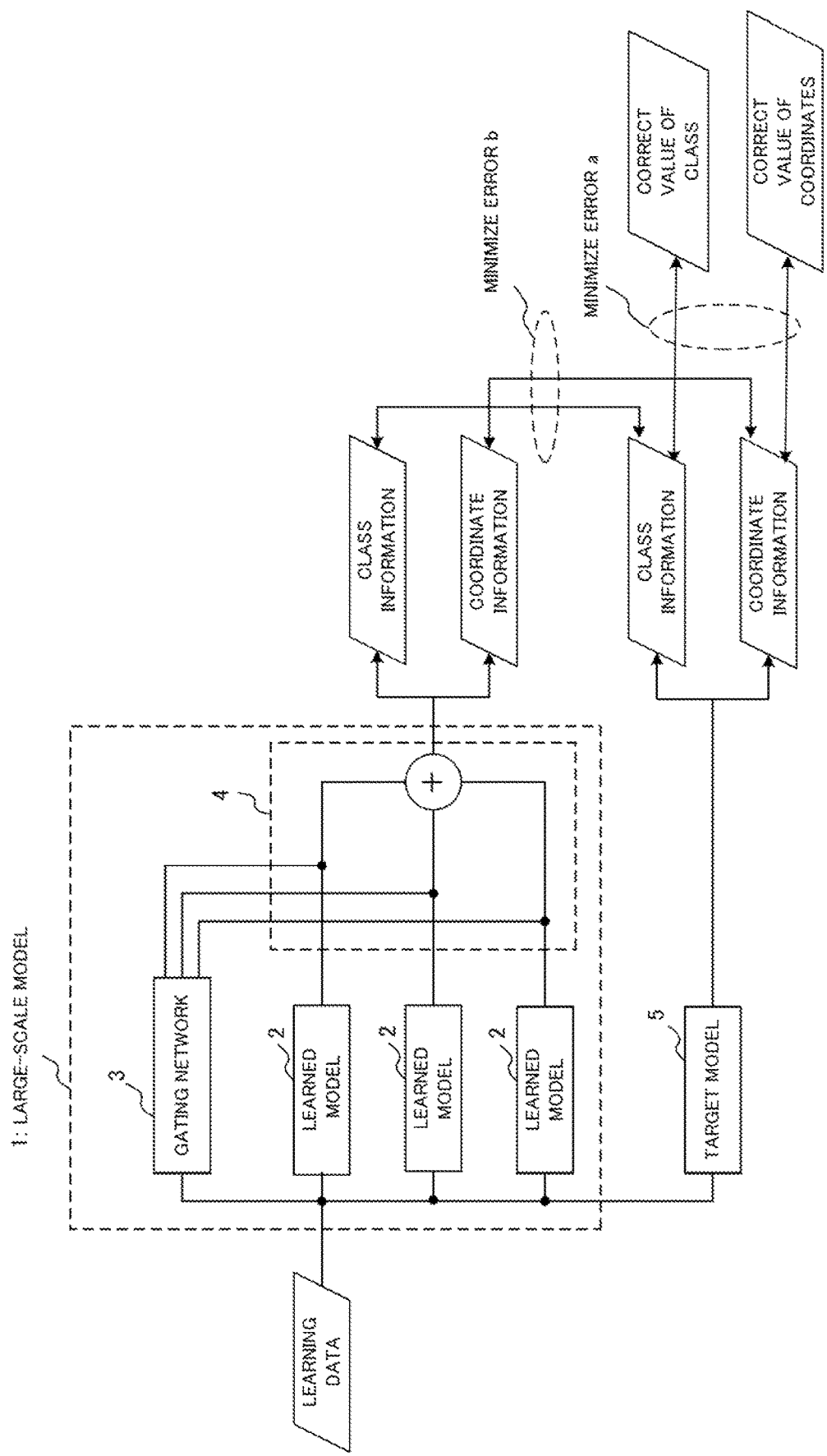
FIG. 14 illustrates a configuration for constructing a target model using a large-scale model.

First, a basic principle of the second example embodiment will be described. In the second example embodiment, a small-scale model for a new site, i.e., a target model is constructed using the large-scale model according to the first example embodiment. FIG. 14 shows a configuration for constructing a target model using the large-scale model 1. The large-scale model 1 is the model in which the learning of the gating network 3 is completed, and the learning of the target model 5 is executed here. To the target model 5, the learning data is inputted. Incidentally, the target model 5 is constructed by the same model as the learned model 2. In the learning of the target model 5, as the teacher data, the information outputted by the large-scale model 1 are used in addition to the ground truth labels prepared in advance. Specifically, the class information and the coordinate information outputted by the target model 5 based on the inputted learning data are compared with the correct value of the class and the correct value of the coordinates prepared in advance for the learning data, and the learning of the target model 5 is performed so as to minimize the error "a". In addition, the class information and the coordinate information outputted by the target model 5 are compared with the class information and the coordinate information outputted by the large-scale model 1 based on the same learning data, and the learning of the target model 5 is performed so as to minimize the error "b". However, the error of the coordinate information is computed only for the anchors of the position where the object exists in the ground truth label, and the error of the coordinate information is set to "0" for the anchors of the position where the object does not exist.

Figure 15:
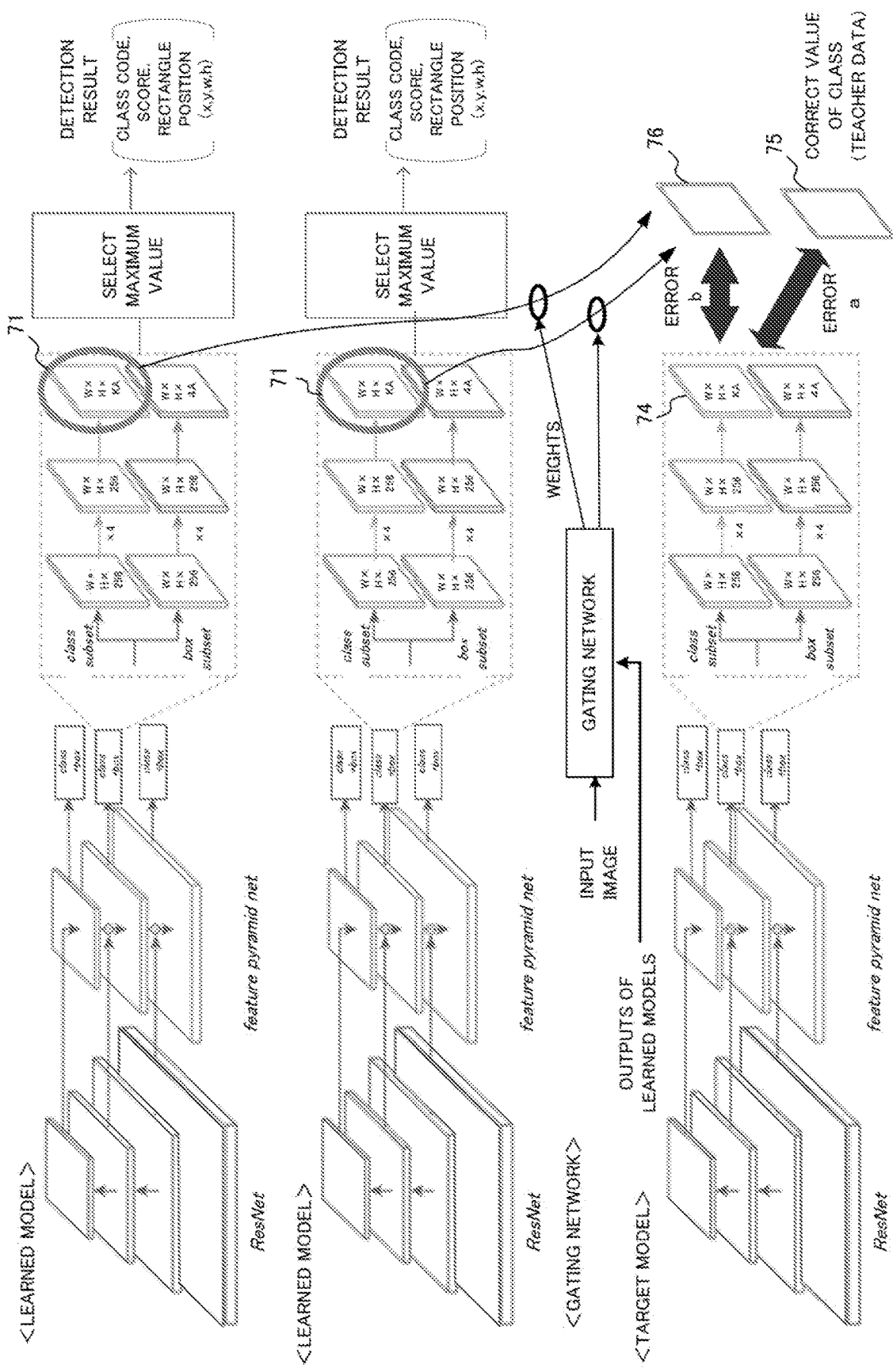
FIG. 15 schematically illustrates an example of the processing of constructing a target model.

FIG. 15 schematically shows a specific example of processing for constructing a target model using a large-scale model for which learning has been completed. In FIG. 15, the learned model 2 is constructed by RetinaNet. In FIG. 15, for convenience of explanation, it is assumed that learning using only class information is performed. The large-scale model 1 computes the weighted sum of the class information 71 outputted by the learned models 2 and the weights outputted by the gating network 3, and outputs the class information 76. On the other hand, the target model 5 outputs the class information 74 based on the learning data. The error "a" between the class information 74 outputted by the target model 5 and the correct value 75 of the class prepared in advance, and the error "b" between the class information 74 outputted by the target model and the class information 76 outputted by the large-scale model 1 are used as the loss. The learning of the target model 5 is performed so as to minimize the loss.

Thus, in the second example embodiment, multiple source models learned in various environments are merged to construct a large-scale model that is robust to environmental change. Then, the inference result of the large-scale model is used as the teacher data, and the learning of the target model is performed using the learning data collected in the new site. This makes it possible to construct a small-scale and high-accuracy target model suitable for the environment of a new site.

[Hardware Configuration]

The hardware configuration of the object detection device according to the second example embodiment is the same as the object detection device according to the first example embodiment shown in FIG. 4.

First Example

Next, a first example of the second example embodiment will be described.

(Functional Configuration for Learning)

Figure 16:
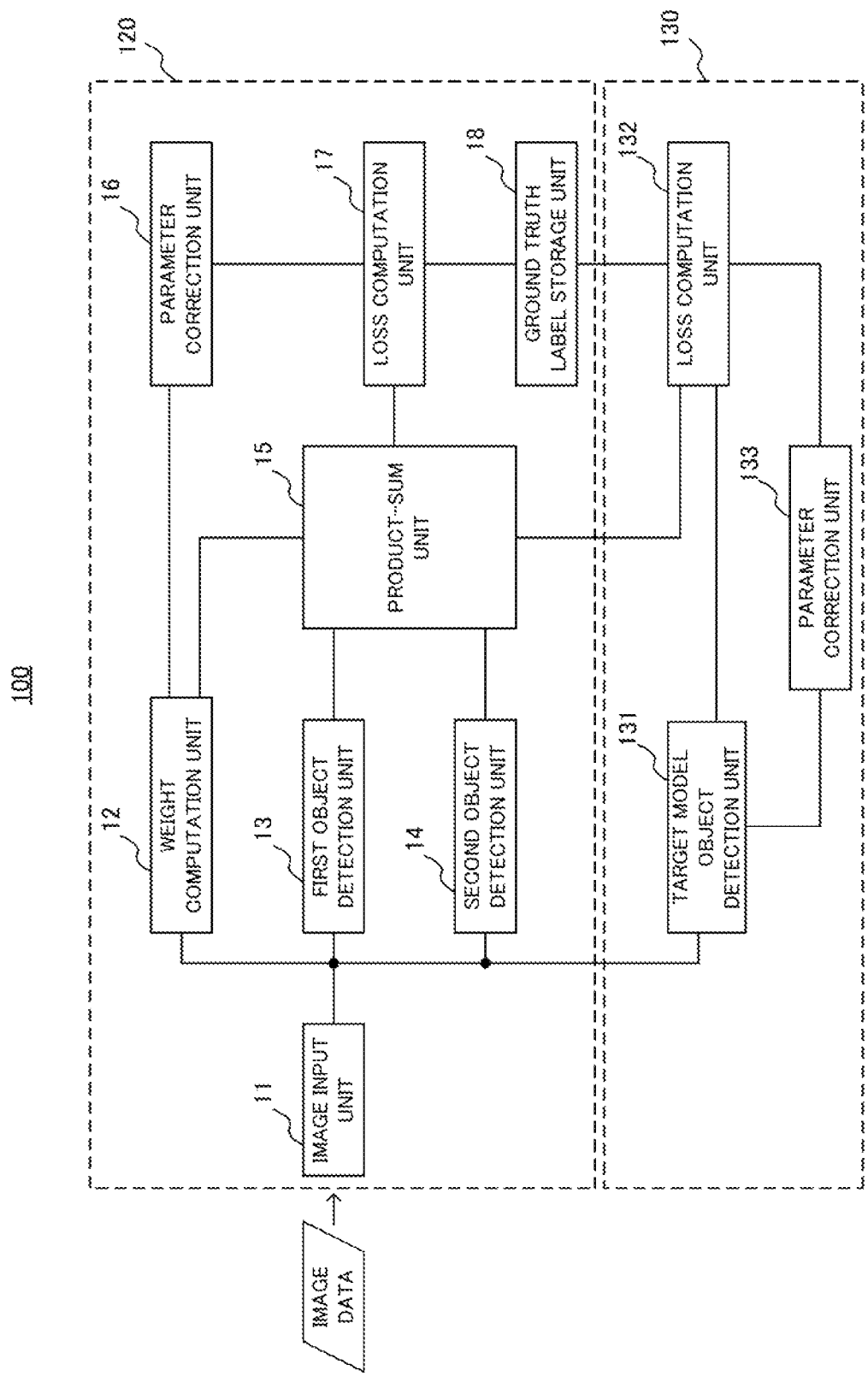
FIG. 16 illustrates a functional configuration of the object detection device for learning according to a first example.

First, the functional configuration of the object detection device for learning will be described. FIG. 16 is a block diagram illustrating a functional configuration of the object detection device 100 for learning according to the first example. The object detection device 100 first executes a learning step of a large-scale model including a plurality of object detection units (hereinafter, referred to as a "large-scale model learning step"), and then executes a learning step of a target model using the learned large-scale model (hereinafter, referred to as a "target model learning step").

As illustrated, the object detection device 100 roughly includes a large-scale model unit 120 and a target model unit 130. The large-scale model unit 120 has the configuration basically the same as the object detection device 10 of the first example of the first example embodiment shown in FIG. 5. Specifically, the large-scale model unit 120 includes an image input unit 11, a weight computation unit 12, a first object detection unit 13, a second object detection unit 14, a product-sum unit 15, a parameter correction unit 16, a loss computation unit 17, and a ground truth label storage unit 18. Since the large-scale model unit 120 operates in the same way as the object detection device 10 of the first example of the first example embodiment, its description will be omitted.

On the other hand, the target model unit 130 includes a target model object detection unit 131, a loss computation unit 132, and the parameter correction unit 133.

The target model object detection unit 131 is an object detection unit of the target model to be newly constructed. The target model object detection unit 131 has a configuration similar to the neural network for object detection, which is the same configuration as the first object detection unit 13 and the second object detection unit 14. The target model object detection unit 131 outputs the score information and the coordinate information of the recognition target object to the loss computation unit 132 based on the image data for learning inputted to the image input unit 11.

The loss computation unit 132 checks the score information and the coordinate information outputted by the target model object detection unit 131 with the ground truth label stored in the ground truth label storage unit 18, similarly to the loss computation unit 17, and calculates the identification loss and the regression loss. Further, the loss computation unit 132 checks the score information and the coordinate information outputted by the target model object detection unit 131 with the score information and the coordinate information outputted by the product-sum unit 15 to calculate the identification loss and the regression loss. The score information and the coordinate information outputted by the product-sum unit 15 correspond to the score information and the coordinate information by the large-scale model unit 120. Then, the loss computation unit 132 supplies the computed loss to the parameter correction unit 133.

Incidentally, the image data for learning may include image data (referred to as "unlabeled image data") that does not have a ground truth label. For the unlabeled image data, the loss computation unit 132 may check the score information and the coordinate information outputted by the target model object detection unit 131 only with the score information and the coordinate information outputted by the product-sum unit 15 to generate the identification loss and the regression loss and output to them to the parameter correction unit 133. Hereinafter, the loss computed by the loss computation unit 132 is also referred to as "target model loss". Incidentally, the loss computation unit 132 corresponds to the second loss computation unit, and the target model loss corresponds to the second loss.

The parameter correction unit 133 corrects the parameters of the network in the target model object detection unit 131 so as to reduce the loss computed by the loss computation unit 132. The parameter correction unit 133 may determine the correction amount of the parameters by the normal error backpropagation method. The parameter correction unit 133 is an example of a second parameter correction unit.

Figure 17:
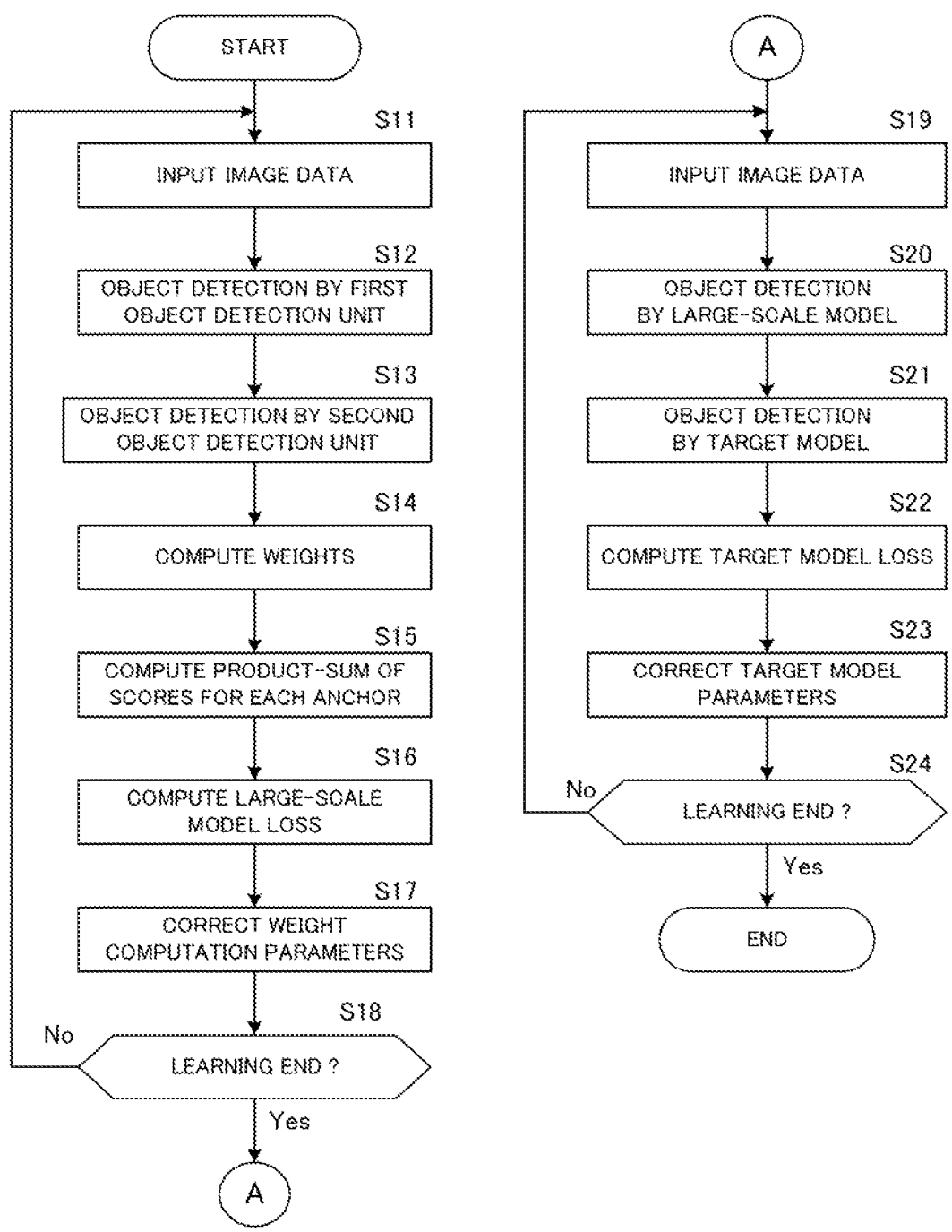
FIG. 17 is a flowchart of a learning processing by the object detection device of the first example.

Next, operations by the object detection device 100 for learning will be described. FIG. 17 is a flowchart of a learning processing by the object detection device 100. This processing is achieved by causing the processor 43 illustrated in FIG. 4 to execute a program prepared in advance. In FIG. 17, steps S111 to S118 correspond to the large-scale model learning step, and steps S119 to S124 correspond to the target mode learning step. Incidentally, during the execution of the large-scale mode learning step, the target model object detection unit 131, the loss computation unit 132 and the parameter correction unit 133 do not operate.

First, image data for learning is inputted into the image input unit 11 (step S111). The first object detection unit 13 performs object detection using the image data, and outputs score information and coordinate information about recognition target objects in the images for each anchor and each recognition target object (step S112). Similarly, the second object detection unit 14 performs object detection using the image data, and outputs score information and coordinate information about recognition target objects in the images for each anchor and each recognition target object (step S113). The weight computation unit 12 computes weights with respect to each of the outputs from the first object detection unit 13 and the second object detection unit 14 based on the image data and the outputs from the first object detection unit 13 and the second object detection unit 14 (step S114).

Next, the product-sum unit 15 multiplies the score information and the coordinate information about the recognition target objects outputted by the first object detection unit 13 and the score information and the coordinate information about the recognition target objects outputted by the second object detection unit 14 by the respective weights computed by the weight computation unit 12 for each anchor, and adds the results of the multiplications to output the average value (step S115). Next, the loss computation unit 17 checks the difference between the obtained average value and the ground truth labels, and computes the loss in the large-scale model (hereinafter referred to as "the large-scale model loss") (step S116). The large-scale loss is an example of the third loss, the loss computation unit 17 is an example of the third loss computation unit, and the parameter correction unit 16 is an example of the third parameter correction unit. Then, the parameter correction unit 16 corrects the weight computation parameters in the weight computation unit 12 to reduce the value of the large-scale model loss (step S117).

The object detection device 100 repeats the above steps S111 to S117 while a predetermined condition holds true, and then ends the process. Note that the "predetermined condition" is a condition related to the number of repetitions, the degree of change in the value of the loss, or the like, and any method widely adopted as a learning procedure for deep learning can be used. Thus, the large-scale model is constructed.

When the large-scale model learning step is completed (Step S118: Yes), the target model learning step is executed next. In the target model learning step, the internal parameters of the weight computation unit 12 are fixed to the values learned in the large-scale model learning step. Incidentally, the internal parameters of the first object detection unit 13 and the second object detection unit 14 are also fixed to the previously learned values.

When the image data for learning is inputted to the image input unit 11 (Step S119), the large-scale model unit 120 performs object detection using the inputted image data, and outputs the score information and the coordinate information of the recognition target object in the image to the loss computation unit 132 for each anchor and for each recognition target object (Step S120). Further, the target model object detection unit 131 performs object detection using the inputted image data, and outputs the score information and the coordinate information of the recognition target object in the image to the loss computation unit 132 for each anchor and each recognition target object (step S121). Next, the loss computation unit 132 compares the score information and the coordinate information outputted by the target model object detection unit 131 with the ground truth label stored in the ground truth label storage unit 18 and the score information and the coordinate information outputted by the large-scale model unit 120 to compute the target model loss (step S122). Then, the parameter correction unit 133 corrects the parameters in the target model object detection unit 131 so as to reduce the value of the target model loss (step S123). The object detection device 100 repeats the above-described steps S119 to S124 for a predetermined period of time, and then ends the processing.

As described above, according to the object detection device 100 according to the first example of the second example embodiment, first, learning of the large-scale model is performed using a plurality of learned object detection units, and then learning of the target model is performed using the large-scale model. Therefore, it becomes possible to construct a small-scale and high-accuracy target model suitable for the environment of the new site.

(Functional Configuration for Inference)

Figure 18:
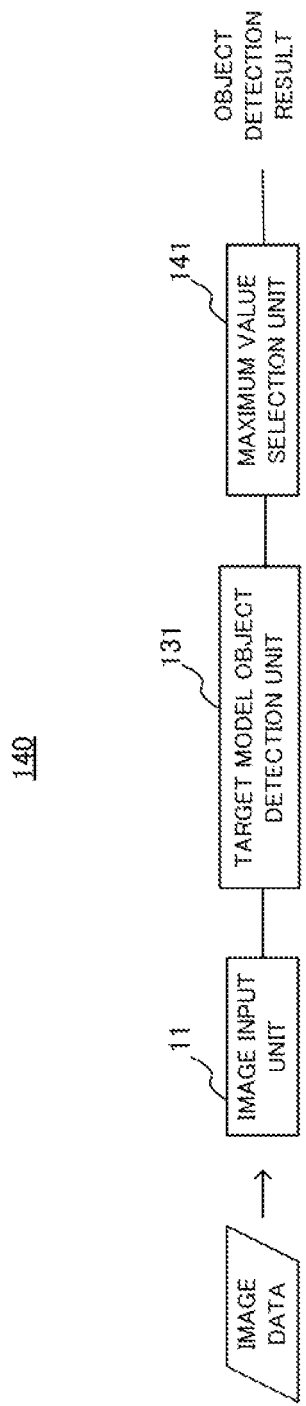
FIG. 18 illustrates a functional configuration of the object detection device for inference according to the first example.

Next, the functional configuration of the object detection device for inference will be described. FIG. 18 is a block diagram illustrating a functional configuration of an object detection device 140 for inference. Incidentally, the object detection device 140 for inference is also basically realized by the hardware configuration shown in FIG. 4.

As shown in FIG. 18, the object detection device 140 for inference includes an image input unit 11, a target model object detection unit 131, and a maximum value selection unit 141. Here, the image input unit 11 and the target model object detection unit 131 are the same as the object detection device 100 for learning shown in FIG. 16. Incidentally, the target model object detection unit 131 has already been learned by the target model learning step described above.

When the image data for inference is inputted to the image input unit 11, the target model object detection unit 131 performs object detection using the learned internal parameters, and outputs the score information and the coordinate information of the recognition target object for each anchor and for each recognition target object. The maximum value selection unit 141 identifies the type of the recognition target object by applying the NMS processing to the score information of Nark dimensions outputted by the target model object detecting section 131, and specifies the position of the recognition target object from the coordinate information corresponding to the anchor to output the object detection result. The object detection result includes the type and the position for each of the recognition target object. Thus, it is possible to obtain the object detection result using the target model object detection unit 131 learned using the large-scale model.

To the first example of the second example embodiment described above, the modifications (1-1) to (1-6) may be applied in the same manner. Also, to the first example of the second example embodiment, the following modification (2-1) may be applied.

(2-1) While the weight computation unit 12 according to the first example embodiment sets a single weight for the image as a whole with respect to the output of each object detection unit, the weight computation unit 12 may compute a weight for each anchor with respect to the output of each object detection unit, that is, for each partial region of the image. Provided that Na is the number of anchors set in the image data and Nf is the number of object detection units, the number of dimensions of the information indicating the weight outputted by the weight computation unit 22 is Na×Nf dimensions. The weight computation unit 12 can be configured by a deep neural network applicable to multidimensional regression problems or the like. Also, the weight computation unit 12 may include a network having a structure that averages the weights corresponding to nearby anchors, such that nearby anchors for respective object detection units have weights that are as close to each other as possible.

Second Example

Next, a second example embodiment of the second example embodiment will be described. Incidentally, the object detection device 100*x* for learning described below is realized by the hardware configuration shown in FIG. 4. In the first example, a large-scale model is learned first, and then the large-scale model is used to learn the target model. In contrast, in the second example, learning of the large-scale model and learning of the target model are performed simultaneously.

(Functional Configuration for Learning)

Figure 19:
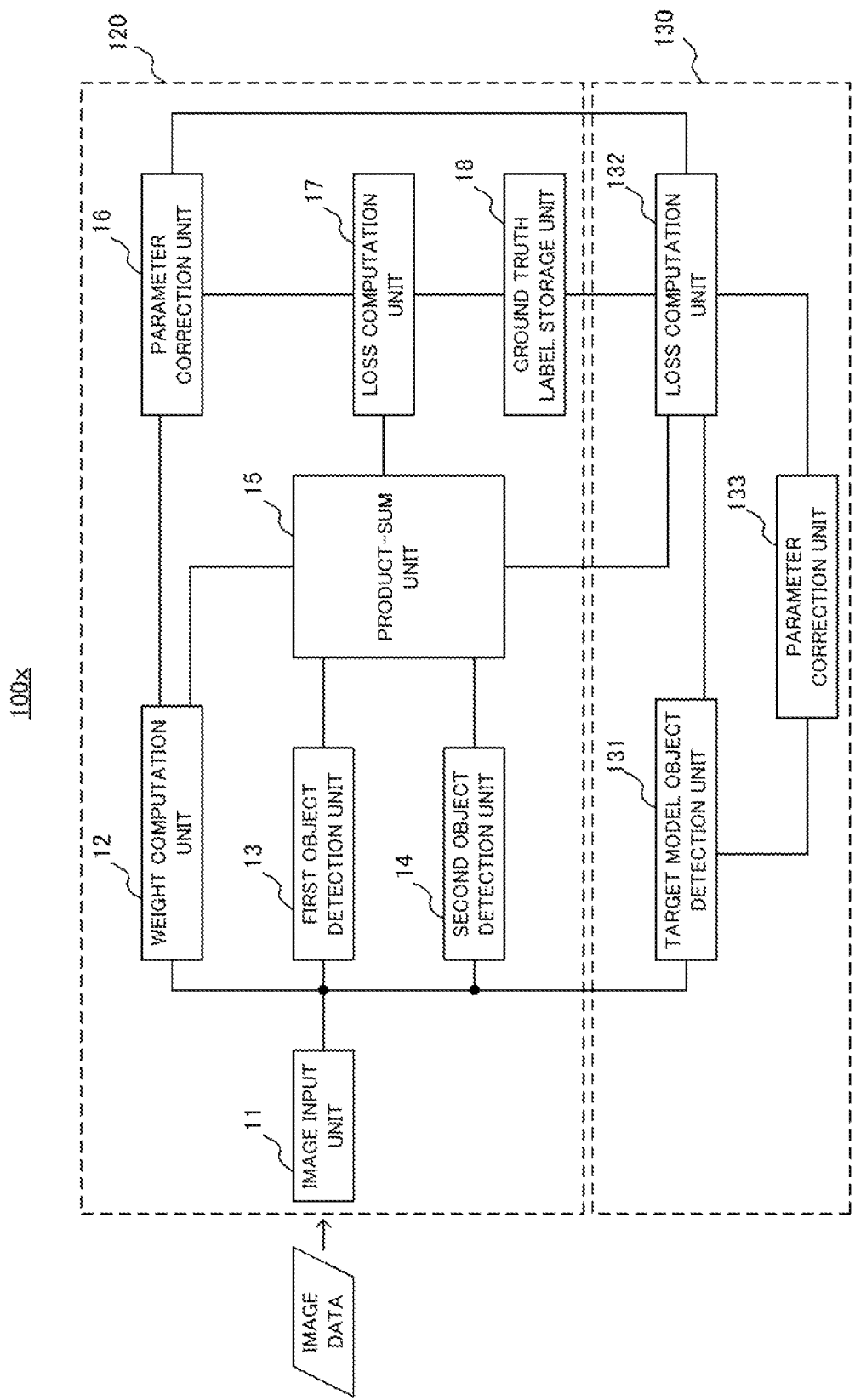
FIG. 19 illustrates a functional configuration of the object detection device for learning according to a second example.

FIG. 19 is a block diagram illustrating a functional configuration of the object detection device 100*x* for learning according to the second example. As illustrated, in the object detection device 100*x* for learning according to the second example, the output of the loss computation unit 132 is also supplied to the parameter correction unit 16. Except for this point, the object detection device 100*x* for learning according to the second example is the same as the object detection device 100 of the first example shown in FIG. 16, and each element operates basically in the same manner as the first example.

In the second example, the loss computation unit 132 supplies the target model loss not only to the parameter correction unit 133, but also to the parameter correction unit 16. The parameter correction unit 16 corrects the weight computation parameters of the weight computation unit 12 in consideration of the target model loss. Specifically, the parameter correction unit 16 corrects the weight computation parameters so that the large-scale model loss and the target model loss are reduced.

Figure 20:
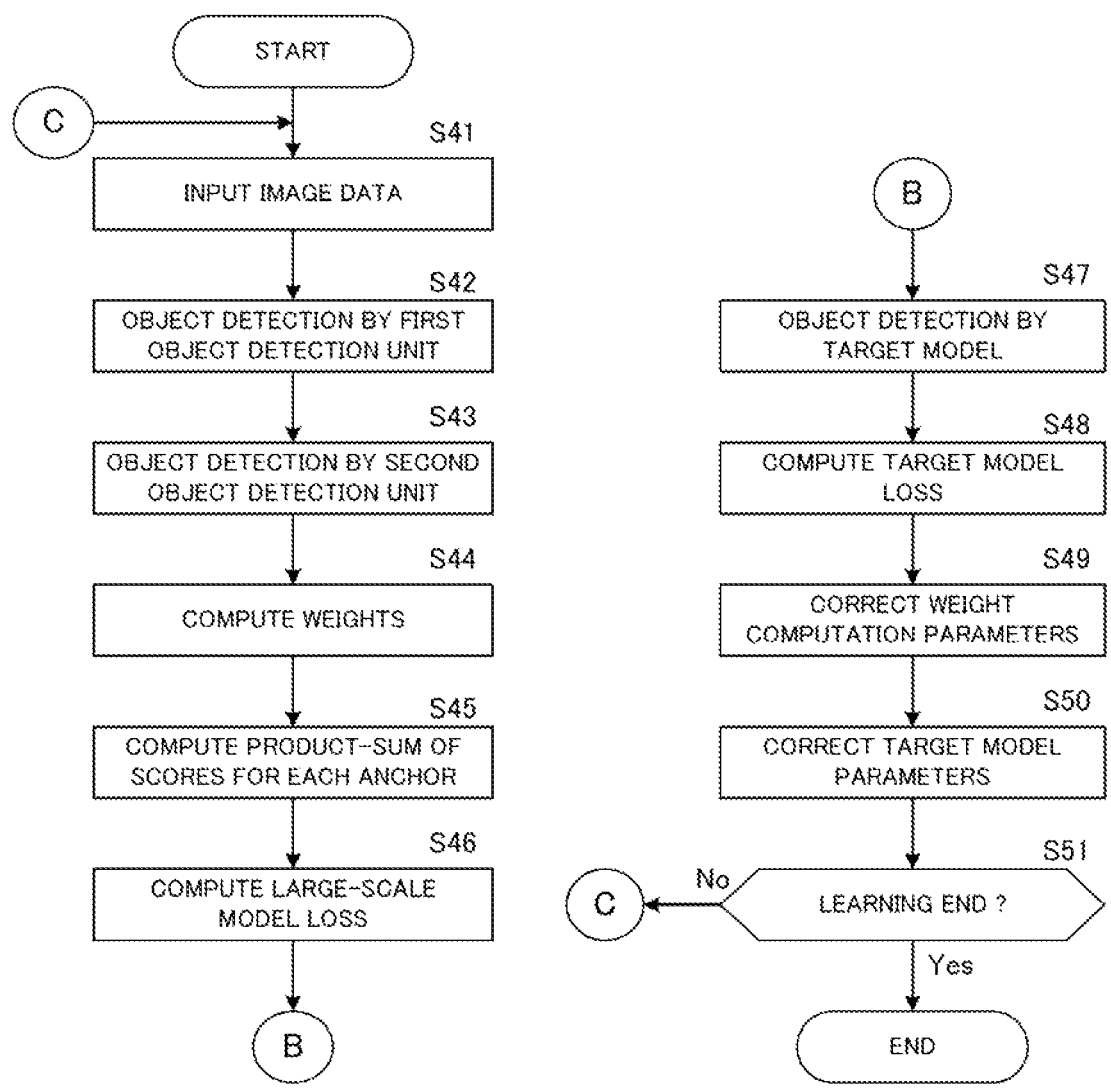
FIG. 20 is a flowchart of learning processing by the object detection device according the second example.

Next, the operation of the object detection device 100*x* for learning will be described. FIG. 20 is a flowchart of learning processing performed by the object detection device 100*x*. This processing is realized by causing the processor 43 shown in FIG. 4 to execute a program prepared in advance. In the learning processing illustrated in FIG. 20, steps S141 to S146 are the same as steps S111 to S116 of the learning processing performed by the object detection device 100 according to the first example illustrated in FIG. 17, and thus description thereof is omitted.

When the loss computation unit 17 computes the large-scale model loss in step S146, the target model object detection unit 131 performs object detection using the inputted image data, and outputs the score information and the coordinate information of the recognition target object in the image for each anchor and for each recognition target object (step S147). Next, the loss computation unit 132 compares the score information and the coordinate information outputted by the target model object detection unit 131 with the ground truth label and the score information and the coordinate information outputted by the large-scale model unit 120 to compute the target model loss, and supplies the target model loss to the parameter correction unit 16 and the parameter correction unit 133 (step S148).

The parameter correction unit 16 corrects the weight computation parameters of the weight computation unit 12 so that the large-scale model loss and the target model loss are reduced (step S149). Further, the parameter correction unit 133 corrects the parameters in the target model object detection unit 131 so that the target model loss is reduced (step S150). The object detection device 100*x* repeats the above-described steps S141 to S150 for a predetermined period of time, and ends the processing.

As described above, according to the object detection device 100*x* of the second example, the learning step of the large-scale model and the learning step of the target model can be executed simultaneously. Therefore, it becomes possible to efficiently construct a target model suitable for the environment of the new site.

(Functional Configuration for Inference)

Since the object detection device for inference according to the second example is the same as the object detection device 140 for inference according to the first example shown in FIG. 18 and operates in the same manner, description thereof will be omitted.

(Modification)

The modifications (1-1) to (1-6) in the first example embodiment, and the modification (2-1) in the second example embodiment can be similarly applied to the second example of the second example embodiment.

Third Example (Principle)

Next, a third example of the second example embodiment will be described. As shown in FIG. 14, in the first example and the second example of the second example embodiment, the target model 5 outputs the class information and the coordinate information for the input image data. Then, the learning of the target model 5 is performed so as to minimize the error "a" between the class information and the coordinate information outputted by the target model and the correct value of the class and the correct value of the coordinates prepared in advance, as well as the error "b" between the class information and the coordinate information output by the target model 5 and the class information and the coordinate information outputted by the large-scale model from the same learning data.

Figure 21:
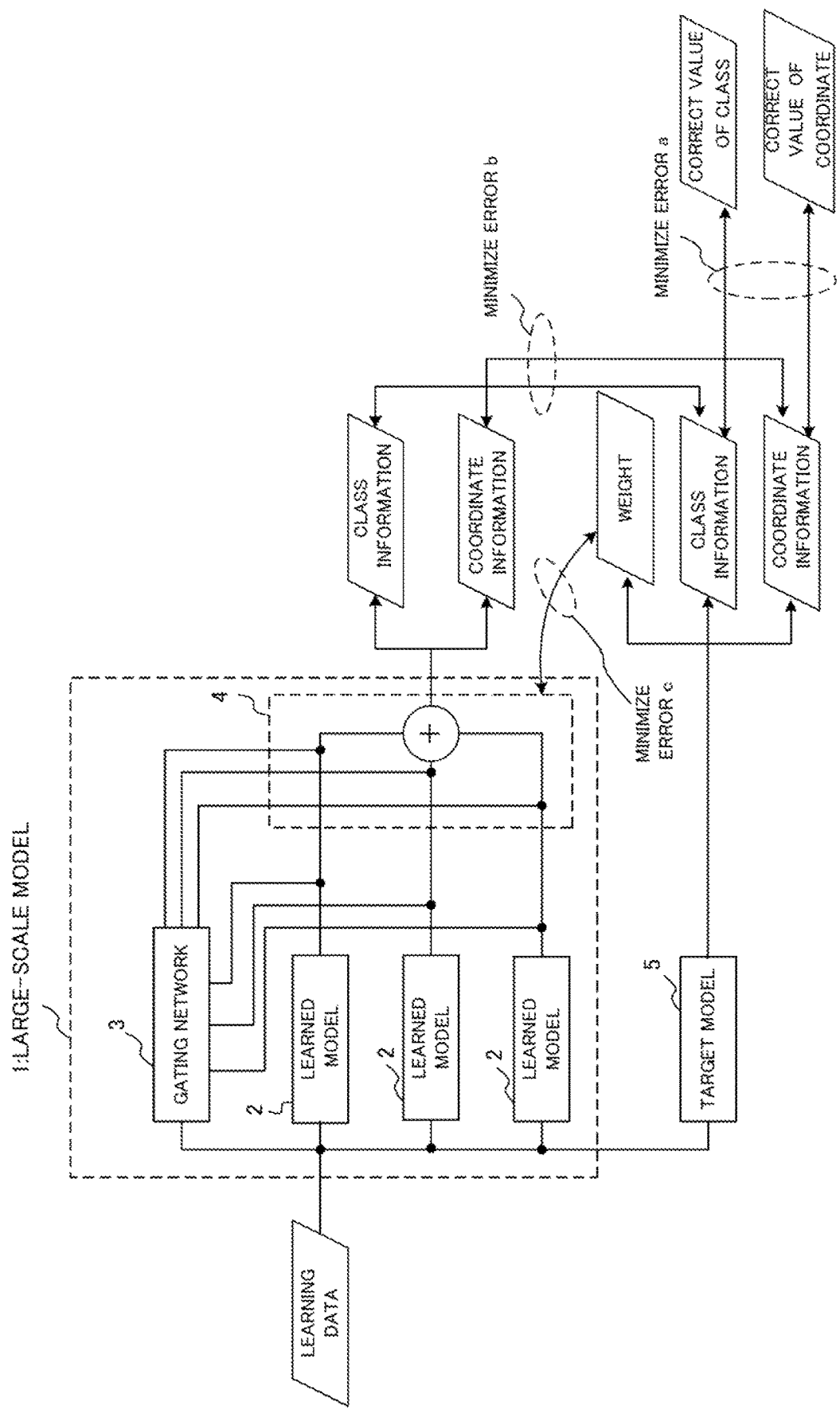
FIG. 21 is a diagram for explaining a principle of a third example embodiment.

In contrast, in the third example, as shown in FIG. 21, the target model 5 estimates and outputs the weights outputted by the gating network 3 in addition to the class information and the coordinate information on the basis of the inputted image data. The weights are used when the arithmetic unit 4 merges the output of each learned model 2. In the example of FIG. 21, since the large-scale model 1 includes three learned models 2, the target model 5 outputs the weights for three learned models 2. The weight for each learned model 2 outputted by the target model 5 is compared with the weight for each learned model 2 calculated by the gating network 3, and the learning of the target model 5 is performed so that the error "c" is minimized. According to the third example, since the target model 5 is learned by using the weights generated by the gating network 3 in the large-scale model 1 in addition to the class information and the coordinate information outputted by the large-scale model 1, it can be expected that the characteristics of the large-scale model 1 are appropriately reflected to the target model 5.

(Functional Configuration for Learning)

The method of the third example can be applied to the first embodiment and the second embodiment. When the method of the third example is applied to the first example, the configuration of the object detection device for learning according to the third example is basically the same as the object detection device 100 of the first example shown in FIG. 16. However, the product-sum unit 15 of the large-scale model unit 120 outputs the weights for the first object detection unit 13 and the second object detection unit 14 computed by the weight computation unit 12, i.e., the weight for each object detection unit, to the loss computation unit 132 of the target model unit 130. Also, the target model object detection unit 131 of the target model unit 130 computes the weights for the first object detection unit 13 and the second object detection unit 14 in addition to the class information and the coordinate information on the basis of the image data inputted as the learning data and outputs the weights to the loss computation unit 132. The loss computation unit 132 computes the sum of the errors between the weight for each object detection unit inputted from the product-sum unit 15 and the weight for each object detection unit inputted from the target model object detection unit 131 (corresponding to the aforementioned error "c". Hereinafter, also referred to as "weight loss"), and outputs the weight loss to the parameter correction unit 133 in a manner included in the target model loss. The parameter correction unit 133 corrects the parameters of the target model object detection unit 131 so as to minimize the target model loss including the weight loss. Incidentally, the weight loss is an example of the fourth loss.

In this way, when the method of the third example is applied to the first example, the learning process is performed in the same manner as the learning processing of the first example shown in FIG. 17. However, in step S121 of FIG. 17, the target model object detection unit 131 computes the weight for each object detection unit. Further, the loss computation unit 132 computes the target model loss including the weight loss in step S122.

On the other hand, when the method of the third example is applied to the second example, the configuration of the object detection device for learning according to the third example is basically the same as the object detection device 100x of the second example shown in FIG. 19. However, in the object detection device 100x of the second example, since the loss computation unit 132 outputs the target model loss including the weight loss to the parameter correction unit 16, the parameter correction unit 16 corrects the weight computation parameters of the weight computation unit 12 also using the target loss including the weight loss.

In this way, when the method of the third example is applied to the second example, the learning processing is performed in the same manner as the learning processing of the second example shown in FIG. 20. However, the target model object detection unit 131 computes the weight for each object detection unit in step S147 of FIG. 20, and the loss calculation unit 132 calculates the target model loss including the weight loss in step S148. Then, the parameter correction unit 16 corrects the parameters of the weight computation unit 12 using the target model loss including the weight loss in step S149, and the parameter correction unit 133 corrects the parameters of the target model object detection unit 131 using the target model loss including the weight loss in step S150.

(Functional Configuration for Inference)

Since the object detection device for inference according to the third example is the same as the object detection device 140 for inference according to the first example shown in FIG. 18 and operates in the same manner, the description thereof will be omitted.

(Modifications)

The modifications (1-1) to (1-6) in the first example embodiment, and the modification (2-1) in the second example embodiment can be similarly applied to the third example of the second example embodiment.

Third Example Embodiment

Figure 22:
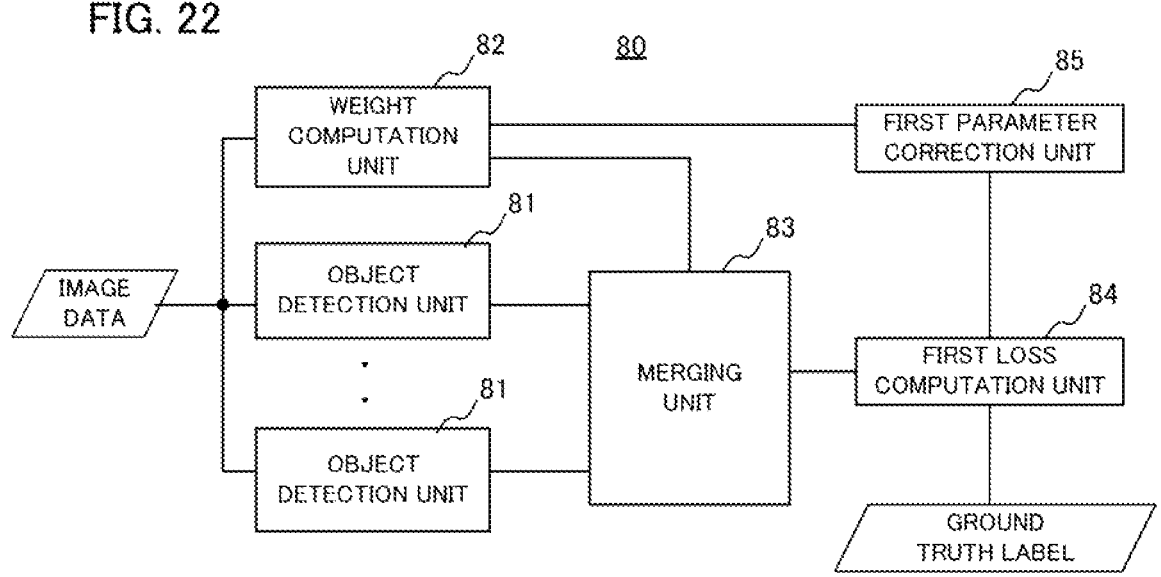
FIG. 22 shows a functional configuration of an object detection device according to the third example embodiment.

Next, a description will be given of a third example embodiment. FIG. 22 is a block diagram showing a functional configuration of an object detection device 80 according to the third example embodiment. Incidentally, the object detection device 80 is realized by the hardware configuration shown in FIG. 4.

The object detection device 80 includes a plurality of object detection units 81, a weight computation unit 82, a merging unit 83, a first loss computation unit 84, and a first parameter correction unit 85. The plurality of object detection units 81 output a score indicating a probability that a predetermined object exists for each partial region set with respect to inputted image data. The weight computation unit 82 uses weight computation parameters to compute a weight for each of the plurality of object detection units 81 on a basis of the image data and outputs of the plurality of object detection units 81, the weight being used when the scores outputted by the plurality of object detection units 81 are merged. The merging unit 83 merges the scores outputted by the plurality of object detection units 81 for each partial region according to the weights computed by the weight computation unit 82. The first loss computation unit 85 computes a difference between a ground truth label of the image data and the score merged by the merging unit 83 as a first loss. Then, the first parameter correction unit 85 corrects the weight computation parameters so as to reduce the first loss.

Figure 23:
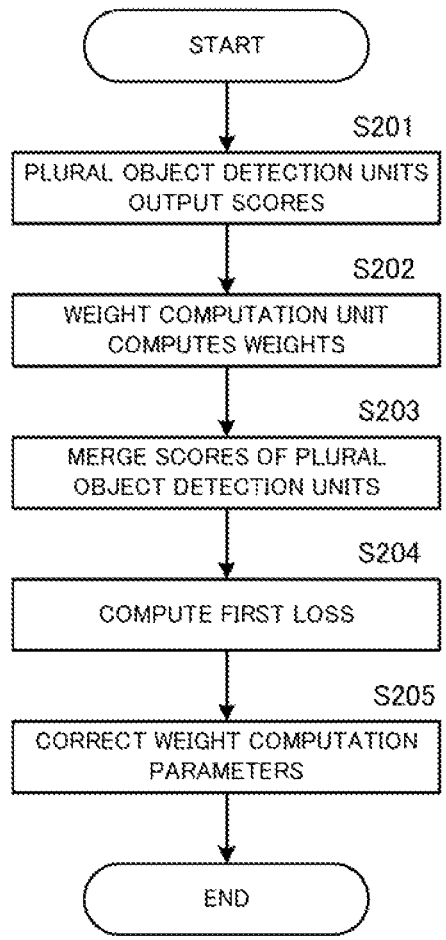
FIG. 23 is a flowchart of processing by the object detection device according to the third example embodiment.

FIG. 23 is a flowchart of processing performed by the object detection device 80 according to the third example embodiment. First, the plurality of object detection units 81 output a score indicating a probability that a predetermined object exists for each partial region set with respect to inputted image data (step S201). The weight computation unit 82 uses weight computation parameters to compute a weight for each of the plurality of object detection units 81 on a basis of the image data and outputs of the plurality of object detection units 81, the weight being used when the scores outputted by the plurality of object detection units 81 are merged (step S202). The merging unit 83 merges the scores outputted by the plurality of object detection units 81 for each partial region according to the weights computed by the weight computation unit 82 (step S203). The first loss computation unit 85 computes a difference between a ground truth label of the image data and the score merged by the merging unit 83 as a first loss (step S204). Then, the first parameter correction unit 85 corrects the weight computation parameters so as to reduce the first loss (step S205). Thus, according to the third example embodiment, it is possible to create a large-scale model that appropriately merges the outputs of the plurality of object detection units 81.

The Fourth Example Embodiment

Figure 24:
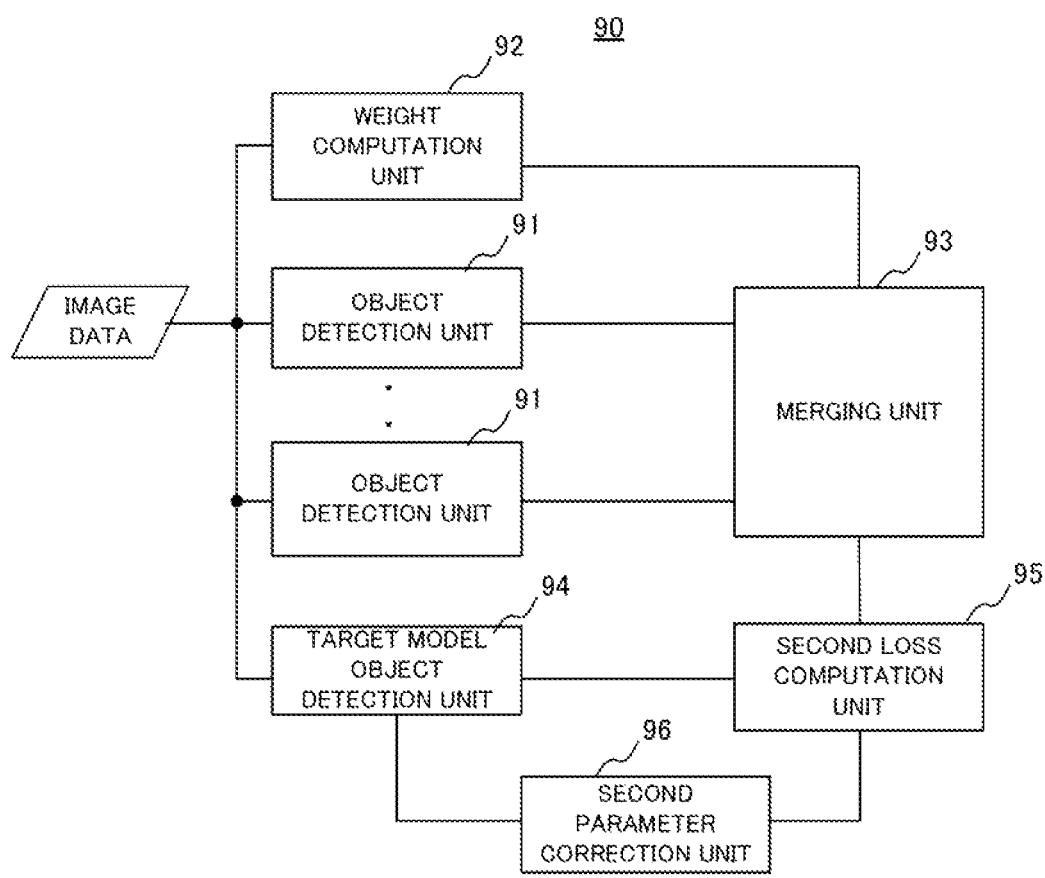
FIG. 24 shows a functional configuration of an object detection device according to a fourth example embodiment.

Next, a description will be given of a fourth example embodiment. FIG. 24 is a block diagram showing a functional configuration of an object detection device 90 according to the fourth example embodiment. Incidentally, the object detection device 90 is realized by the hardware configuration shown in FIG. 4.

The object detection device 90 includes a plurality of object detection units 91, a weight computation unit 92, a merging unit 93, a target model object detection unit 94, a second loss calculation unit 95, and a second parameter correction unit 96. The plurality of object detection units 91 output a score indicating probability that a predetermined object exists, for each partial region set to image data inputted. The weight computation unit 92 computes weights for merging the scores outputted by the plurality of object detection units 91, using weight computation parameters, based on the image data and outputs of the plurality of object detection units 91. The merging unit 93 merges the scores outputted by the plurality of object detection units 91, for each partial region, with the weights computed by the weight computation unit 92. The target model object detection unit 94 outputs a score indicating probability that the predetermined object exists, for each partial region set to the image data. The second loss computation unit 95 computes a second loss indicating a difference of the score of the target model object detection unit 94 from a ground truth label of the image data and the score merged by the merging unit 93. The second parameter correction unit 96 corrects parameters of the target model object detection unit 94 to reduce the second loss.

Figure 25:
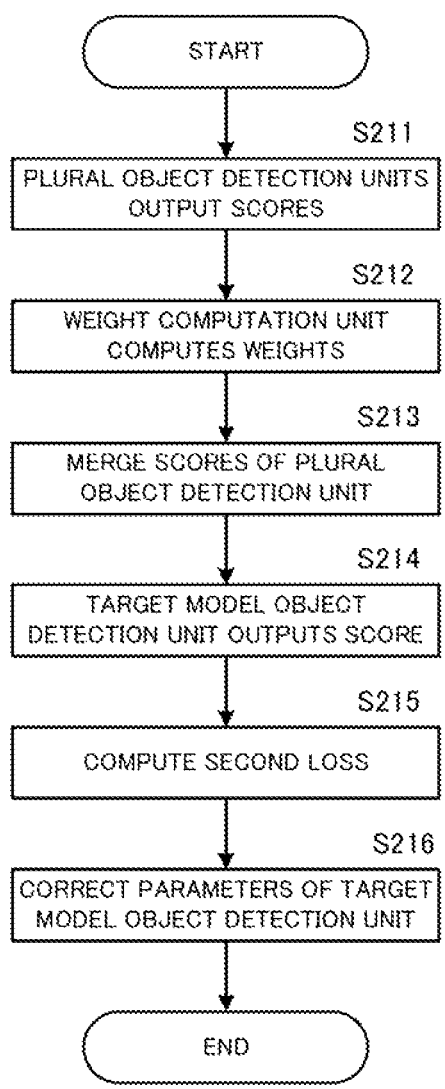
FIG. 25 is a flowchart of processing by the object detection device according to the fourth example embodiment.

FIG. 25 is a flowchart illustrating processing performed by the object detection device 90 according to the fourth example embodiment. First, the plurality of object detection units 91 output a score indicating probability that a predetermined object exists, for each partial region set to image data inputted (step S211). The weight computation unit 92 computes weights for merging the scores outputted by the plurality of object detection units 91, using weight computation parameters, based on the image data and outputs of the plurality of object detection units 91 (step S212). The merging unit 93 merges the scores outputted by the plurality of object detection units 91, for each partial region, with the weights computed by the weight computation unit 92 (step S213). The target model object detection unit 94 outputs a score indicating probability that the predetermined object exists, for each partial region set to the image data (step S214). The second loss computation unit 95 computes a second loss indicating a difference of the score of the target model object detection unit 94 from a ground truth label of the image data and the score merged by the merging unit 93 (step S215). The second parameter correction unit 96 corrects parameters of the target model object detection unit 94 to reduce the second loss (step S216). Thus, according to the fourth example embodiment, the target model object detection unit 91 can be learned by using the large-scale model that appropriately merges the outputs of the plurality of object detection units 91.

A part or all of the example embodiments described above may also be described as the following supplementary notes, but not limited thereto.

(Supplementary Note 1)

An object detection device comprising:
a plurality of object detection units configured to output a score indicating a probability that a predetermined object exists for each partial region set with respect to inputted image data;
a weight computation unit configured to use weight computation parameters to compute a weight for each of the plurality of object detection units on a basis of the image data and outputs of the plurality of object detection units, the weight being used when the scores outputted by the plurality of object detection units are merged;
a merging unit configured to merge the scores outputted by the plurality of object detection units for each partial region according to the weights computed by the weight computation unit;
a first loss computation unit configured to compute a difference between a ground truth label of the image data and the score merged by the merging unit as a first loss; and
a first parameter correction unit configured to correct the weight computation parameters so as to reduce the first loss.

(Supplementary Note 2)

The object detection device according to Supplementary note 1,
wherein the weight computation unit is configured to compute a single weight with respect to the image data as a whole, and
wherein the merging unit is configured to merge the scores outputted by the plurality of object detection units according to the single weight.

(Supplementary Note 3)

The object detection device according to Supplementary note 1,
wherein the weight computation unit is configured to compute the weight for each partial region of the image data, and
wherein the merging unit is configured to merge the scores outputted by the plurality of object detection units according to the weight computed for each partial region.

(Supplementary Note 4)

The object detection device according to any one of Supplementary notes 1 to 4, wherein the merging unit is configured to multiply the scores outputted by the plurality of object detection units by the weight for each object detection unit computed by the weight computation unit, add the multiplied scores together, and calculate an average value.

(Supplementary Note 5)

A learned model generation method comprising:
outputting, from a plurality of object detection units, a score indicating a probability that a predetermined object exists for each partial region set with respect to inputted image data;
using weight computation parameters to compute a weight for each of the plurality of object detection units on a basis of the image data and outputs of the plurality of object detection units, the weight being used when the scores outputted by the plurality of object detection units are merged;
merging the scores outputted by the plurality of object detection units for each partial region according to the computed weights;
computing a difference between a ground truth label of the image data and the merged score as a first loss; and
correcting the weight computation parameters so as to reduce the first loss.

(Supplementary Note 6)

A recording medium storing a program causing a computer to execute an object detection device learning process comprising:
outputting, from a plurality of object detection units, a score indicating a probability that a predetermined object exists for each partial region set with respect to inputted image data;
using weight computation parameters to compute a weight for each of the plurality of object detection units on a basis of the image data and outputs of the plurality of object detection units, the weight being used when the scores outputted by the plurality of object detection units are merged;

merging the scores outputted by the plurality of object detection units for each partial region according to the computed weights;

computing a difference between a ground truth label of the image data and the merged score as a first loss; and correcting the weight computation parameters so as to reduce the first loss.

(Supplementary Note 7)

An object detection device comprising:

a plurality of object detection units configured to output a score indicating probability that a predetermined object exists, for each partial region set to image data inputted;

a weight computation unit configured to compute weights for merging the scores outputted by the plurality of object detection units, using weight computation parameters, based on the image data and outputs of the plurality of object detection units;

a merging unit configured to merge the scores outputted by the plurality of object detection units, for each partial region, with the weights computed by the weight computation unit;

a target model object detection unit configured to output a score indicating probability that the predetermined object exists, for each partial region set to the image data;

a second loss computation unit configured to compute a second loss indicating a difference of the score of the target model object detection unit from a ground truth label of the image data and the score merged by the merging unit; and a second parameter correction unit configured to correct parameters of the target model object detection unit to reduce the second loss.

(Supplementary Note 8)

The object detection device according to Supplementary note 7, further comprising:

a third loss computation unit configured to compute a third loss indicating a difference between the ground truth label and the score merged by the merging unit; and a third parameter correction unit configured to correct the weight computation parameters to reduce the third loss.

(Supplementary Note 9)

The object detection device according to Supplementary note 8, wherein the third parameter correction unit corrects the weight computation parameters based on the first second and the third loss.

(Supplementary Note 10)

The object detection device according to any one of Supplementary notes 7 to 9, wherein the target model object detection unit estimates the weights outputted by the weight computation unit based on the image data, wherein the second loss computation unit computes a fourth loss indicating a difference between the weights outputted by the weight computation unit and the weights estimated by the target model object detection unit, and wherein the second parameter correction unit corrects parameters of the target model object detection unit to reduce the second loss and the fourth loss.

(Supplementary Note 11)

A learned model generation method comprising:

outputting a score indicating probability that a predetermined object exists, for each partial region set to inputted image data, from a plurality of object detection units;

computing weights for merging the scores outputted by the plurality of object detection units, using weight computation parameters, based on the image data and outputs of the plurality of object detection units;

merging the scores outputted by the plurality of object detection units, for each partial region, with the computed weights;

outputting a score indicating probability that the predetermined object exists, for each partial region set to the image data, from a target model object detection unit;

computing a second loss indicating a difference of the score of the target model object detection unit from a ground truth label of the image data and the merged score; and correcting parameters of the target model object detection unit to reduce the second loss.

(Supplementary Note 12)

A recording medium recording a program causing a computer to execute a learning processing of an object detection device, comprising:

outputting a score indicating probability that a predetermined object exists, for each partial region set to inputted image data, from a plurality of object detection units;

computing weights for merging the scores outputted by the plurality of object detection units, using weight computation parameters, based on the image data and outputs of the plurality of object detection units;

merging the scores outputted by the plurality of object detection units, for each partial region, with the computed weights;

outputting a score indicating probability that the predetermined object exists, for each partial region set to the image data, from a target model object detection unit;

computing a second loss indicating a difference of the score of the target model object detection unit from a ground truth label of the image data and the merged score; and correcting parameters of the target model object detection unit to reduce the second loss.

The foregoing describes the present invention with reference to example embodiments and examples, but the present invention is not limited to the above example embodiments and examples. The configuration and details of the present invention may be subjected to various modifications that would occur to persons skilled in the art within the scope of the invention.

DESCRIPTION OF SYMBOLS

1 Large-scale model
2 Learned model
3 Gating network
4 Arithmetic unit
5 Target model
10, 10$x$, 20, 20$x$, 30, 30$x$, 100, 100$x$ Object detection device
11 Image input unit
12 Weight computation unit
13, 14 Object detection unit
15 Product sum part
16, 133 Parameter correction unit
17, 132 Loss computation unit 18 Ground truth label storage unit
19, 141 Maximum value selection unit
120 Large-scale model unit
130 Target model unit
131 Target model object detection unit

What is claimed is:

1. An object detection device comprising:
a memory configured to store instructions; and
one or more processors configured to execute the instructions to:
output a score indicating a probability that a predetermined object exists for each partial region set with respect to inputted image data; data, from a plurality of object detection units;
use weight computation parameters to compute a weight for each of the plurality of object detection units on a basis of the image data and outputs of the plurality of object detection units, the weight being used when the scores outputted by the plurality of object detection units are merged;
merge the scores outputted by the plurality of object detection units for each partial region according to the computed weights;
compute a difference between a ground truth label of the image data and the merged score as a first loss; and
correct the weight computation parameters so as to reduce the first loss.

2. The object detection device according to claim 1,
wherein the one or processors compute a single weight with respect to the image data as a whole, and
wherein the one or more processors merge the scores outputted by the plurality of object detection units according to the single weight.

3. The object detection device according to claim 1,
wherein the one or processors compute the weight for each partial region of the image data, and
wherein the one or processors merge the scores outputted by the plurality of object detection units according to the weight computed for each partial region.

4. The object detection device according to claim 1, wherein the one or processors multiply the scores outputted by the plurality of object detection units by the weight computed for each object detection unit, add the multiplied scores together, and calculate an average value.

5. A learned model generation method comprising:
outputting, from a plurality of object detection units, a score indicating a probability that a predetermined object exists for each partial region set with respect to inputted image data;
using weight computation parameters to compute a weight for each of the plurality of object detection units on a basis of the image data and outputs of the plurality of object detection units, the weight being used when the scores outputted by the plurality of object detection units are merged;
merging the scores outputted by the plurality of object detection units for each partial region according to the computed weights;
computing a difference between a ground truth label of the image data and the merged score as a first loss; and
correcting the weight computation parameters so as to reduce the first loss.

6. A recording medium storing a program causing a computer to execute the method according to claim 5.

7. An object detection device comprising:
a memory configured to store instructions; and
one or more processors configured to execute the instructions to:
output a score indicating probability that a predetermined object exists, for each partial region set to image data inputted, from a plurality of object detection units;
compute weights for merging the scores outputted by the plurality of object detection units, using weight computation parameters, based on the image data and outputs of the plurality of object detection units;
merge the scores outputted by the plurality of object detection units, for each partial region, with the computed weights;
output a score indicating probability that the predetermined object exists, for each partial region set to the image data, from a target model object detection unit;
compute a second loss indicating a difference of the score of the target model object detection unit from a ground truth label of the image data and the merged score; and
correct parameters of the target model object detection unit to reduce the second loss.

8. The object detection device according to claim 7, the one or more processors are further configured to execute the instructions to:
compute a third loss indicating a difference between the ground truth label and the merged score; and
correct the weight computation parameters to reduce the third loss.

9. The object detection device according to claim 8, wherein the one or more processors correct the weight computation parameters based on the first second and the third loss.

10. The object detection device according to claim 7,
wherein the one or more processors estimate estimates the weights outputted by the weight computation unit based on the image data by the target model object detection unit,
wherein the one or more processors compute a fourth loss indicating a difference between the outputted weights and the estimated weights, and
wherein the one or more processors correct parameters of the target model object detection unit to reduce the second loss and the fourth loss.

11. The learned model generation method according to claim 5, further comprising:
outputting a score indicating probability that the predetermined object exists, for each partial region set to the image data, from a target model object detection unit;
computing a second loss indicating a difference of the score of the target model object detection unit from a ground truth label of the image data and the merged score; and
correcting parameters of the target model object detection unit to reduce the second loss.

12. A recording medium recording a program causing a computer to execute the method according to claim 5, and
outputting a score indicating probability that the predetermined object exists, for each partial region set to the image data, from a target model object detection unit;
computing a second loss indicating a difference of the score of the target model object detection unit from a ground truth label of the image data and the merged score; and
correcting parameters of the target model object detection unit to reduce the second loss.

* * * * *